US007359861B2

(12) United States Patent
Lee

(10) Patent No.: US 7,359,861 B2
(45) Date of Patent: Apr. 15, 2008

(54) INTER-LANGUAGE TRANSLATION DEVICE

(75) Inventor: Chung-Suk Charles Lee, Durham, NC (US)

(73) Assignee: Polyglot Systems, Inc., Morrisville, NC (US)

(*) Notice: Subject to any disclaimer, the term of this patent is extended or adjusted under 35 U.S.C. 154(b) by 846 days.

(21) Appl. No.: 10/421,084

(22) Filed: Apr. 23, 2003

(65) Prior Publication Data

US 2003/0208352 A1 Nov. 6, 2003

Related U.S. Application Data

(60) Provisional application No. 60/420,372, filed on Oct. 22, 2002, provisional application No. 60/375,037, filed on Apr. 24, 2002.

(51) Int. Cl.
*G06F 17/28* (2006.01)
*A61B 5/00* (2006.01)

(52) U.S. Cl. .................. 704/277; 704/7; 704/8; 600/300

(58) Field of Classification Search .............. None
See application file for complete search history.

(56) References Cited

U.S. PATENT DOCUMENTS

| | | | |
|---|---|---|---|
| 5,169,342 A * | 12/1992 | Steele et al. ............ | 434/112 |
| 5,384,701 A | 1/1995 | Stentiford et al. | |
| 5,810,599 A | 9/1998 | Bishop | |
| 5,854,997 A | 12/1998 | Sukeda et al. | |
| 5,987,402 A | 11/1999 | Murata et al. ............ | 704/2 |
| 6,007,243 A * | 12/1999 | Ergun et al. ............ | 378/197 |
| 6,122,606 A | 9/2000 | Johnson | |
| 6,192,332 B1 | 2/2001 | Golding | |
| 6,240,170 B1 * | 5/2001 | Shaffer et al. ......... | 379/142.15 |
| 6,339,410 B1 * | 1/2002 | Milner et al. ............ | 345/1.1 |
| 6,757,898 B1 | 6/2004 | Ilsen et al. ............ | 709/203 |
| 6,988,075 B1 | 1/2006 | Hacker ............ | 705/3 |
| 6,993,474 B2 * | 1/2006 | Curry et al. ............ | 704/3 |
| 7,013,260 B2 * | 3/2006 | Asada ............ | 704/8 |
| 7,113,904 B2 * | 9/2006 | Litster et al. ............ | 704/8 |
| 2001/0056359 A1 | 12/2001 | Abreu ............ | 705/3 |

(Continued)

OTHER PUBLICATIONS

USPTO Office Action mailed Mar. 5, 2007 for U.S. Appl. No. 11/303,519, "Methods and Systems for Conveying Instructions for Medications", and set of pending claims examined in that Office Action.

(Continued)

*Primary Examiner*—David Hudspeth
*Assistant Examiner*—Matthew J. Sked
(74) *Attorney, Agent, or Firm*—The Eclipse Group LLP; Kevin E. Flynn

(57) ABSTRACT

A computer system with an appropriate set of instructions to allow the computer system to serve as a translation device for use in a structured interview between an interviewer using a first language and an interviewee in a second language in order to minimize or eliminate that need for a human translator during the acquisition of routine information. Problems addressed include: determination of the appropriate language for use as the second language, the use of a single display screen through the use of a toggle function to toggle from the first language to the second language, delivery of context sensitive audio files while controlling the number of screens to be created and presented to the interviewer, and the creation of a set of discharge instructions. A preferred set of hardware and a mobile cart is discussed.

16 Claims, 18 Drawing Sheets

U.S. PATENT DOCUMENTS

2003/0023146 A1    1/2003  Shusterman ................. 600/300
2003/0072021 A1*   4/2003  Stingham ................... 358/1.13
2003/0097251 A1*   5/2003  Yamada et al. ................ 704/7
2003/0171911 A1*   9/2003  Fairweather .................. 704/2
2003/0171912 A1*   9/2003  Cabello et al. ............... 704/3
2004/0015360 A1*   1/2004  Calabrese .................. 704/270

OTHER PUBLICATIONS

Amendment and Reply dated Sep. 5, 2007 to USPTO Office Action mailed Mar. 5, 2007 for U.S. Appl. No. 11/303,519, "Methods and Systems for Conveying Instructions for Medications".

* cited by examiner

*(Screen mockup 1100)*

Tabs: Admin | History | Exam | Labs/Tests | Diagnosis | Procedures | Treatment | Discharge Sub-tabs: language | instructions | registration ... commands | comfort Select panel:
- ▲ name
- age / date of birth
- address
- ID card / SSN
- personal info
- healthcare
- employer
- insurance / billing
- contacts

Name
- What is his name?
- Please say his name again.
- Please write his name on this paper.

Relations
- Are you related to him?
- Are you his mother / father?
- Are you his grandmother / grandfather?
- Are you his sister / brother?
- Are you his aunt / uncle?
- Are you his daughter / son?
- Are you his cousin?
- Are you his friend?
- Are you his neighbor?
- Do you work with him?

Logout | ♀ Ⓜ Ⓕ Ⓤ About ⊙ ⊙ ⊙ ⊙ ⊙ English

Figure 17

INTER-LANGUAGE TRANSLATION DEVICE

This application claims priority to U.S. Provisional Patent Application Ser. No. 60/375,037 filed on Apr. 24, 2002 for Communication Solution for Exchanging Information Across Language Barriers. This application also claims priority to and incorporates by reference a related application with common assignee that also addresses issues related to exchanging information across language barriers—U.S. Provisional patent application No. 60/420,372 filed Oct. 22, 2002 for Inter-Language Dual Screen System.

BACKGROUND OF THE INVENTION

1. Technical Field

This invention is in the field of computer apparatus and methods. More specifically, this invention is in the field of computer apparatus and methods designed to facilitate communication between an interviewer speaking a first language and an interviewee that does not understand the first language but can understand a second language. One particular application of this invention lies in the area of health care, where there is a need for a health care provider to elicit information from a person that does not speak a language known by the health care provider.

2. Description of the Problem and Environment

The United States Census for 2000 estimates indicate that while the US population increased 13 percent over the past decade, the population that speaks English as a second language grew 41 percent. This non-English population is currently 45 million, with the Asian and Hispanic population representing the two ethnic population segments with the highest growth rates. There are approximately 300 languages spoken in the United States today. Of those who speak English as a second language, there are varying levels of English proficiency. The subgroup, Limited English Proficient (LEP) persons, includes those individuals who speak English "not well" or "not at all". This LEP population has increased from 14 million to 19.5 million during the past decade. For this growing population, the ability of the traditional public services to care for this group has not kept pace.

Resources to hire bilingual and multilingual personnel for positions in government, healthcare, financial and social sectors of our community have been limited. Frustration has surfaced on both sides of the community from the communication problems. There is a longstanding need for an efficient solution that provides a quality but inexpensive translation solution to LEPs without draining excessively from the resources needed to provide the services to the LEP and non-LEP clients.

DESCRIPTION OF THE PRIOR ART

While professional interpretation is a commonly used service in international business and diplomacy, it is less-often used in healthcare. Patients and many physicians still rely heavily on one of three sub-optimal mechanisms: 1) their own language skills, 2) the translation ability of family or friends, or 3) ad hoc interpretation (bilingual strangers, such as other available employees). Each of these translation options can pose problems. Any of these non-professional translators may lack sufficient proficiency, often committing stereotypical errors (omissions, additions, substitutions, or other editing), which may result in serious semantic distortions which in turn can negatively affect care.

An important problem, especially in the context of delivering health care is that it can also be difficult for patients to discuss sensitive issues in front of third party informal translators. Bilingual staff and physicians can be more confidential, but the solutions are limited to how many languages they speak and also in their depth of knowledge in the second language.

Professional translators can offer proficiency in interpretation, but are underutilized due to their patchy availability, wait time for arrival, and cost. While professional translators generally maintain a strict code of confidentiality and are skilled in interpreting the sense and intent of what is spoken, they are typically only available during business hours. An additional problem is that finding translators with knowledge of uncommon languages may be difficult.

Professional translators are also expensive, with fees averaging $20/hour and in many cases more than $100/hour. Furthermore, the majority of these professionals are not certified for situations such as medical conversations where discussions on complex medical topics may need to be translated.

Similar to professional translators, the Language Line (formerly known as the AT&T Language Line) is a telephone based professional translation service. The advantage of this service is the diversity of languages provided in a free-form discussion format. The service currently provides around 250 languages and is available 24 hours a day. Many emergency crews, such as fire departments, police officers and EMS units, utilize this service frequently. One telephone handset is usually used for the translation with an operator attempting to identify the patient's language, if unknown, via multiple multi-lingual operators. During the conversation, the telephone handset is handed from doctor to patient back to the doctor until the conversation is completed. This service can be very expensive, depending on the language, and is charged on a per minute fee of $2.20 and up.

The main disadvantage of all of these systems is the inability to verify the conversation. For example, in the medical field, what is said during the translation is left up to the translator without verification by neither the patient nor the physician. If a potential miscommunication does occur, it is difficult to catch the error until it is too late. (e.g., wrong explanation for a diagnosis, miscommunication of drug dosage, inaccurate history of the symptoms, filtering of medically important but culturally sensitive topics (for example: history of sexually-transmitted disease)). A secondary problem common to all telephone conversations is the inability of the translator to pick up on facial and body expressions. These non-verbal clues may indicate uncertainty, reluctance to share information, emphasis, and other important indications about the information conveyed.

Foreign language phase books are another tool that has been used by some people trying to bridge a language gap. These phase books, while sufficient to allow a traveler to find a phone booth or a bathroom, do not allow an interviewer to produce questions on complex topics such as medical histories. An additional problem is that the attempt by the interviewer to pronounce a word in a phrase in a foreign language is likely to mispronounce the word or phrase. While mild mispronunciation may not be a problem for a traveler likely to be seeking one of a small set of nouns, it can be a problem in a more wide ranging interview as the mispronunciation may be incomprehensible or interpreted as some other unintended word or phrase. Languages are more difficult and subtle than can be discerned from a dictionary. Gender, tense (such as past, present, future), number (singular/plural) and other factors impact the way that phrases are modified within a language. Phrase books cannot provide this level of detail. As an illustration, here are just small samples of questions that do not vary in English but do vary in Spanish based on gender.

| | | |
|---|---|---|
| F/You: | Are you currently married? | (¿Ud. es casada?) |
| M/You: | Are you currently married? | (¿Ud. es casado?) |
| F/She: | Are you her friend? | (¿Ud. es la amiga de ella?) |
| M/She: | Are you her friend? | (¿Ud. es el amigo de ella?) |
| F/He: | Are you his neighbor? | (¿Ud. es la vecina de él?) |
| M/He: | Are you his neighbor? | (¿Ud. es el vecino de él?) |

Further, while a simple question such as saying "headache" in a tone indicating a question may elicit a response, the response from the LEP interviewee will be in a language not spoken by the interviewer and may convey subtleties such as intensity, duration, frequency, and attempts to treat the headache. A phrase book does not provide an adequate tool for the interviewer to process the response. This sequence of events leads to frustration and wasted time.

An extension of a phrase book is a tool that pronounces the selected word or phrase in the translated language. While this eliminates the added problem of the interviewer pronouncing the correct word or phrase in an incorrect way, it does not assist the interviewer in processing the response. It does not address the need to adjust the pronounced word for the current context (gender, singular/plural, tense and so forth). Further, such an audio tool is useless unless the interviewer can discern the appropriate language to use with this particular interviewee.

PROBLEMS WITH PRIOR ART SOLUTIONS

Thus, although various prior art solutions have addressed pieces of the problem, the prior art has not provided a solution to facilitate structured interviews between an interviewer speaking a first language and an interviewee speaking a second language, without resorting to the expense of a human interpreter. As referenced above, it is not practical to have one or more translators present 24 hours a day and seven days a week for each of the languages that are likely to be needed in order to provide structured interviews. Dial up translation is expensive and time consuming. Although necessary in order to address issues beyond the foreseeable questions of a structured interview, a tool is needed to cover the standard questions of a structured interview.

Prior art tools have not adequately addressed the initial step in the interview across a language barrier; the identification of the language that is spoken by the interviewee. While the prior art has provided a pamphlet with text in a number of languages as a tool for identifying an appropriate language for use with the interviewee, this is not a suitable tool for an interviewee who is illiterate or blind.

Prior art tools have not handled the need to modify phrases to reflect the impact of gender on the phrase within the language of the interviewee.

Prior art tools have not adapted to the common situation where the subject of the interview is not the interviewee. For example, if a parent brings a child to an emergency room, the interviewee is the parent, but the subject is the child. In some languages, the proper phrasing of the question needs to reflect the gender of the child and the gender of the interviewee.

Prior art tools may have facilitated the expression of certain questions by the interviewer to the interviewee, but a truly useful tool must facilitate the receipt of information back to the interviewer from the interviewee.

Prior art tools have not provided a computer based means for the guiding the selection of a language from a set of languages in order to provide a set of questions and instructions to the interviewee as selected by the interviewer. A typical example of this scenario is the need to provide discharge instructions to a patient or caregiver of a patient.

The prior art has not provided a mobile system that is adapted to address these problems and is also adapted to facilitate a structured interview across a language barrier.

These and other advantages of the present invention are apparent from the drawings and the detailed description that follows.

It is an object of the present invention to provide a tool to facilitate structured interviews where the interviewer and the interviewee do not share a common language in order to reduce or eliminate the need for human translators to assist in the capture of routine information.

It is another object of the present invention to provide a tool that facilitates the identification of a language understood by the interviewee.

It is another object of the present invention to provide a tool that adjusts the format of routine questions or routine instructions for the gender of the interviewee and if necessary adjusts the response to reflect the gender of the subject and the gender of the subject's caregiver/interviewee.

It is another object of the present invention to provide a tool that facilitates the communication of information from the interviewee to the interviewer across the language barrier.

It is another object of the present invention to provide a tool that can be used to select a specific language from a set of languages and then give the interviewer the ability to select a set of instructions to provide to the interviewee.

It is another object of the present invention to provide a tool to facilitate communication across a language barrier that is mobile so that the tool can be moved where needed and thus avoid the need to equip every room with such a tool.

BRIEF SUMMARY OF DISCLOSURE

A solution to problems existing with prior art solutions is disclosed. The solution includes a set of computer program instructions to facilitate certain structured exchanges between an interviewer who uses a first language and an interviewee that uses a second language. The structured exchange uses a combination of yes/no questions and displays of choices in the language of the interviewee to minimize the need for the interviewer to receive unstructured (free-form) information in the second language.

One aspect of the present invention is a sequence of steps to identify an appropriate language for use with the interviewee. Another aspect of the present invention allows the interviewer to toggle from screens using the first language to screens using the second language so that the interviewee can be presented with text in the second language without requiring the interviewer to work in the second language or requiring a second display.

Aspects of the present invention adjust the audio output in the second language to include context such as gender without requiring a proliferation in the number of screens to be navigated by the interviewer.

An aspect of the present invention is tailored to the creation and presentation of an instruction set such as a set of discharge instructions from a hospital emergency room.

The instructions can be presented in audio form in the language of the interviewee and can be printed in the languages of the interviewee and in the language of the interviewer.

One variation of the present invention uses a docked tablet computer placed on a rotating turntable on a mobile cart. This particular arrangement is well-suited for use by more than one interviewer or by the same interviewer in more than one room. While the present invention was disclosed with particular attention to a preferred embodiment in a particular situation (hospital emergency room), the present invention can be adapted to use other choices of hardware or interface styles and can be adapted for use in many situations beyond the example of the hospital emergency room.

BRIEF DESCRIPTION OF THE DRAWINGS

FIGS. 9, 10, and 11 show three variations of one logical screen to be presented to the interviewer as modified to adjust to various for different possible interview subjects (interviewee is subject, subject is not interviewee and is female, subject is not interviewee and is male).

FIG. 12 is shown in both Mexican Spanish. FIG. 13 is shown in English.

FIG. 15 is shown in both Mexican Spanish. FIG. 16 is shown in English.

FIG. 17 shows a computer display screen for Discharge Instructions including the list of condition templates 1716.

DETAILED DESCRIPTION OF THE DISCLOSED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In order to provide context for the present invention and to highlight the features of the invention with meaningful examples, the invention is described in the context of an emergency room for a hospital. In this scenario, the various service providers within the hospital are assumed to know English. Some, but possibly not all the service providers know some form of Spanish—most likely the form of Spanish spoken in Mexico. In this example, the population of people that come to the emergency room for services includes people that do not speak English. As at least some of the arrivals at an emergency room do not have an appointment or a pre-existing relationship with the service providers, it is possible that someone will walk into the emergency room needing assistance and no one will be able to communicate to that person. Sometimes the person (interviewee) is the person needing medical care (the "subject of the interview"). Other times the person who needs to communicate with the service providers is a care giver for the person needing care. Typical examples include a parent providing information about a child needing care, or a young relative providing information about an elderly person needing care.

While this emergency room scenario is useful for highlighting the use of the present invention, one could employ such a device in a wide range of situations where one person would approach another to request a limited range of services. Examples of such situations include: assistance to travelers at: airports, hotels, train stations, or other facilities that cater to travelers. The present invention could be used by service personnel on planes, trains, buses, or ships to communicate with passengers who have questions or need instructions. A more comprehensive discussion of the range of uses is provided in the discussion of Alternative Embodiments.

Hardware

The present invention includes computer software running on a computer. The software must be stored on media and be accessible by a processor which executes the program. The program must be able to receive input from the interviewer and directly or indirectly from the interviewee. The program must be able to act through the computer system to communicate to the interviewer and interviewee.

Figure 1:
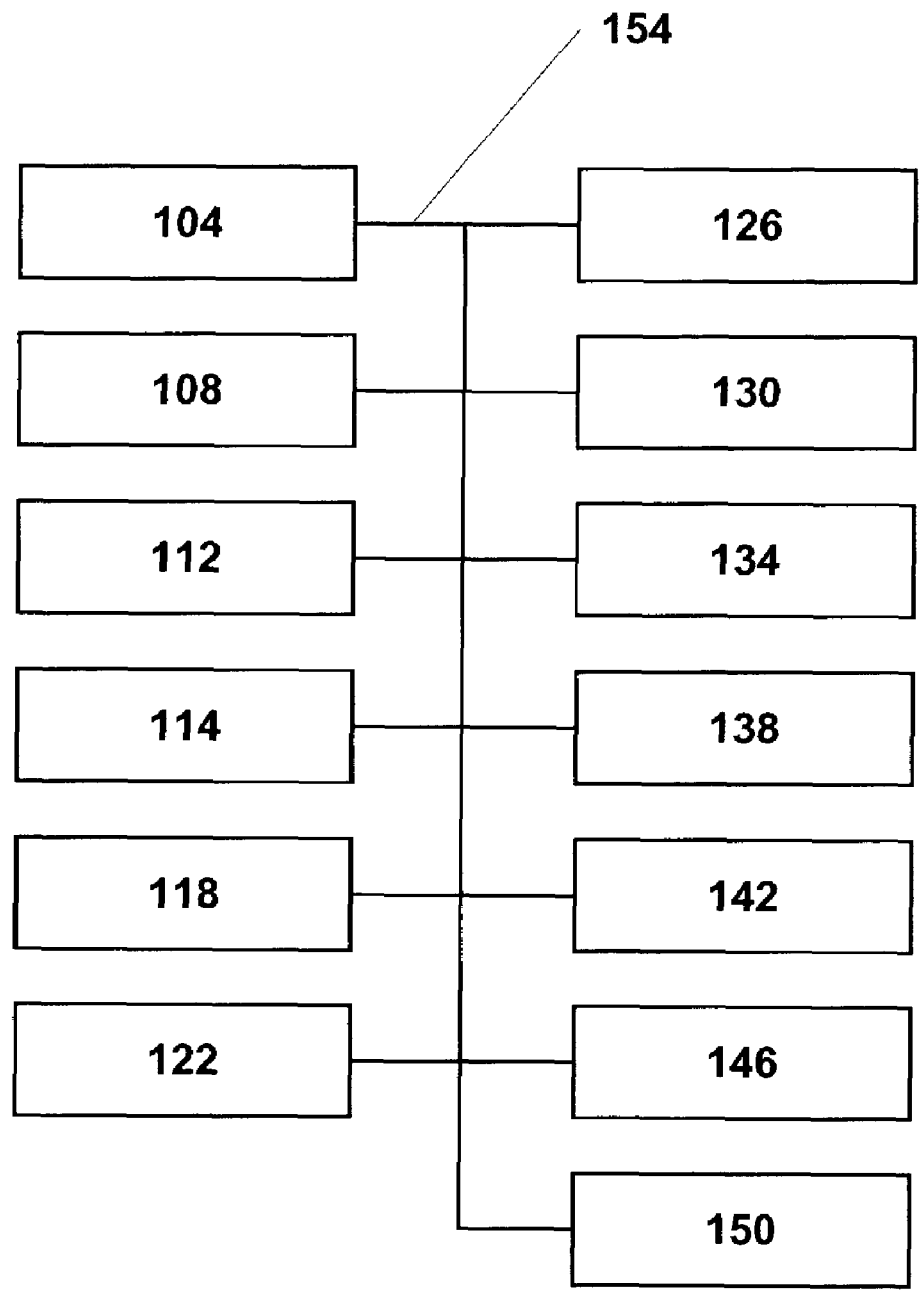
FIG. 1—A block diagram of computer system components as know in the prior art.

Computer systems such as personal computers are known in the art can be represented generically by FIG. 1. Such a system will comprise a number of separate pieces but can be diagrammed as follows:

104 is an I/O Controller. An Input Output Controller works with the CPU for handling certain aspects of interactions with input/output devices.

108 is a DMA controller to allow direct communication between certain peripherals and RAM.

112 is the Central Processor Unit (CPU or Microprocessor). The CPU executes instructions and manipulates data.

114 is the Clock. The clock provides the one or more clock signals used by other components.

118 is the RAM (Random Access Memory) which is used for temporary memory when executing software.

122 is the ROM (Read Only Memory) which contains permanent memory such as start up instructions for the CPU.

126 is a Mass Storage Device. Most computers have one or more mass storage devices such as hard drives that store programs and data.

130 is a Media Drive. Most computers have one or more media drives such as CD drives or disc drives which can read programs and data from removable media. Many of these drives can also write to removable media.

134 is a Display. Most computers have one or more displays that provide a means for displaying text or graphics.

138 is an Input Device. Most computers have one or more input devices such as keyboards, computer mouse, touch pad, touch screen, light pen, digitizer tablet, or joy stick. Most computers have more than one input device such as a keyboard and a mouse.

142 is a Network Connection. Many computers have one or more network connections. The network connection may include a specialized card such as a NIC card (network interface card), or a wireless card to enable a particular type of wireless connection such as Bluetooth or one of the versions of 802.11.

146 is a Printer. Most computers have some access to a printer or other output device that produces output on paper. These include printers, plotters, bar code printers. Some computers access printers through the network connection.

150 is a Speaker. Most computers have one or more speakers to provide audio feedback, music, sound effects, and voice.

154 represents the buses. The various components in the computer are connected by a set of buses that carry data, control signals, and addresses. As the subject matter of this patent does not involve an improvement to computer buses, the buses are shown in an over simplified manner to avoid unnecessary clutter.

Those of ordinary skill in the art will recognize that FIG. 1 does not capture all of the subcomponents necessary to operate a computer (no power supply for example). FIG. 1 does not show all possible variations of computers as certain elements can be combined together such as combining the clock and the CPU. Further, a computer may have more elements than are shown in FIG. 1 including multiple instances of components shown in FIG. 1 and additional elements not shown in FIG. 1. Finally a computer can be configured to be lacking one or more elements shown in FIG. 1. For example a computer can be configured to operate without a DMA controller, or some elements of the computer of FIG. 1 can be removed from the computer, especially if it has access to such components through a network connection.

Figure 2:
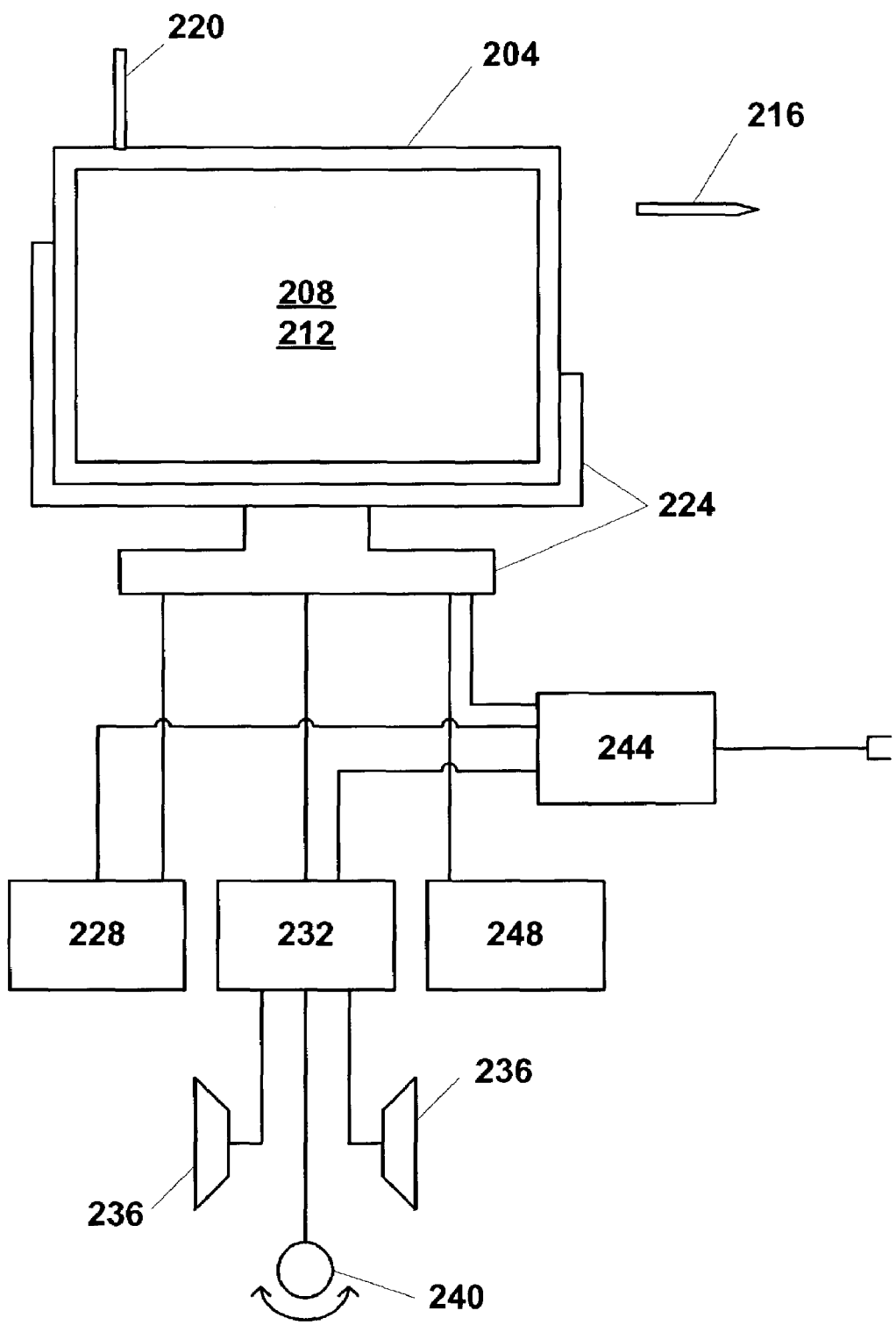
FIG. 2—A block diagram of components for one preferred embodiment of the present invention featuring a docked tablet computer.

FIG. 2 shows the system of components for one preferred embodiment of the present invention. A tablet computer 204 contains the various components shown in FIG. 1 except that it has only a printer port rather than a printer and the speakers used in the preferred embodiment are external to the tablet computer 204.

The elements of interest include the display 208 and the tablet input 212 which is activated by the contact or proximity of a stylus 216. Although the surface of the display is the same as the surface of the tablet input, these are functionally two different components. As an implementation detail, it is useful to note that there are advantages in many situations in having two or even three styluses. Different applications may choose to have one, two or three styluses. The details are discussed in the Alternative Embodiment section.

The tablet computer 204 may have its own wireless connection 220 (the rectangular box protruding from the tablet computer is merely included to provide something to label and does not represent the appearance of the wireless connection).

For this application, the tablet computer 204 is placed in a docking station 224. The docking station 224 allows the tablet computer to be placed in an orientation so it can be seen while resting on a rolling cart. In a most preferred embodiment, the docking station with the tablet computer is mounted on a surface that can be easily rotated if desired between an optimal position for viewing by the interviewer and an optimal position for viewing by the interviewee. A turntable such as a "Lazy-Susan" device of adequate capacity is suitable for this purpose. Ideally, the tablet computer 204 is locked into the docking station 224 and the docking station 224 is locked to the turntable which is in turn locked into the rolling cart.

As is known in the art, the tablet computer 204 and docking station 224 can be configured to mate to provide electrical connection to the various ports within the docked tablet computer 204. This can be done by mating with the normal ports or through a special docking bus port (not shown). The net effect is that the docking station 224 has ports that are electrically connected to the docked tablet computer 204.

Thus a printer 228 can be connected to the docking port 224 and placed on the mobile cart with the tablet computer system.

In the preferred embodiment, an external speaker controller 232 is mounted over the docking station 224 and is connected to one or more audio inputs on the docking station 224. The speaker controller 232 is connected to one or more speakers 236. In the preferred embodiment a volume control 240 is connected to the speaker controller 232 and placed where it is easy to access by the interviewer and interviewee.

As the system is located on a mobile cart, a rechargeable battery 244 located on the mobile cart provides power to the various components.

Element 248 highlights that the docking port 224 has a network connection that can be used to connect the tablet computer 204 to an external network (not shown) via an appropriate connector such as an Ethernet cable (not shown). The use of a network connection is one way to load the necessary software and any updates. As most tablet computers do not have an internal media drive, the other way to load programs onto the tablet computer would be through an external media drive, including CD drives, DVD drives, Memory Stick, or other media drives. One could also use a keyboard such as an external keyboard connected to a USB port to type in programs.

The current preferred choices for hardware are as follows:

Tablet Computer

Microsoft Windows Tablet PC Model M1200 distributed by Motion Computing (www.motioncomputing.com; Austin, Tex.). The tablet computer can be locked to the docking station using a Kingston-type notebook lock (PC Guardian; San Rafael, Calif.). Preferred Accessories include a USB Keyboard and a DVD/CDR Drive.

Speaker Controller

PowerMate multimedia controller for volume control (Griffin Technology, www.griffintechnology.com, Nashville, Tenn.)

Docking Station

Model: M-series Flexdock distributed by Motion Computing. Note, the docking station is secured down to the turntable using security screws.

Turntable

Custom made 16" diameter hard surface mounted to a lazy-Susan turnstile mechanism.

Note, the turntable is secured to the cart using screws.

Cart

Werndl Communicator distributed by Werndl (a subsidiary of SteelCase, Inc. www.steelcase.com, Grand Rapids, Mich.)

Figure 3:
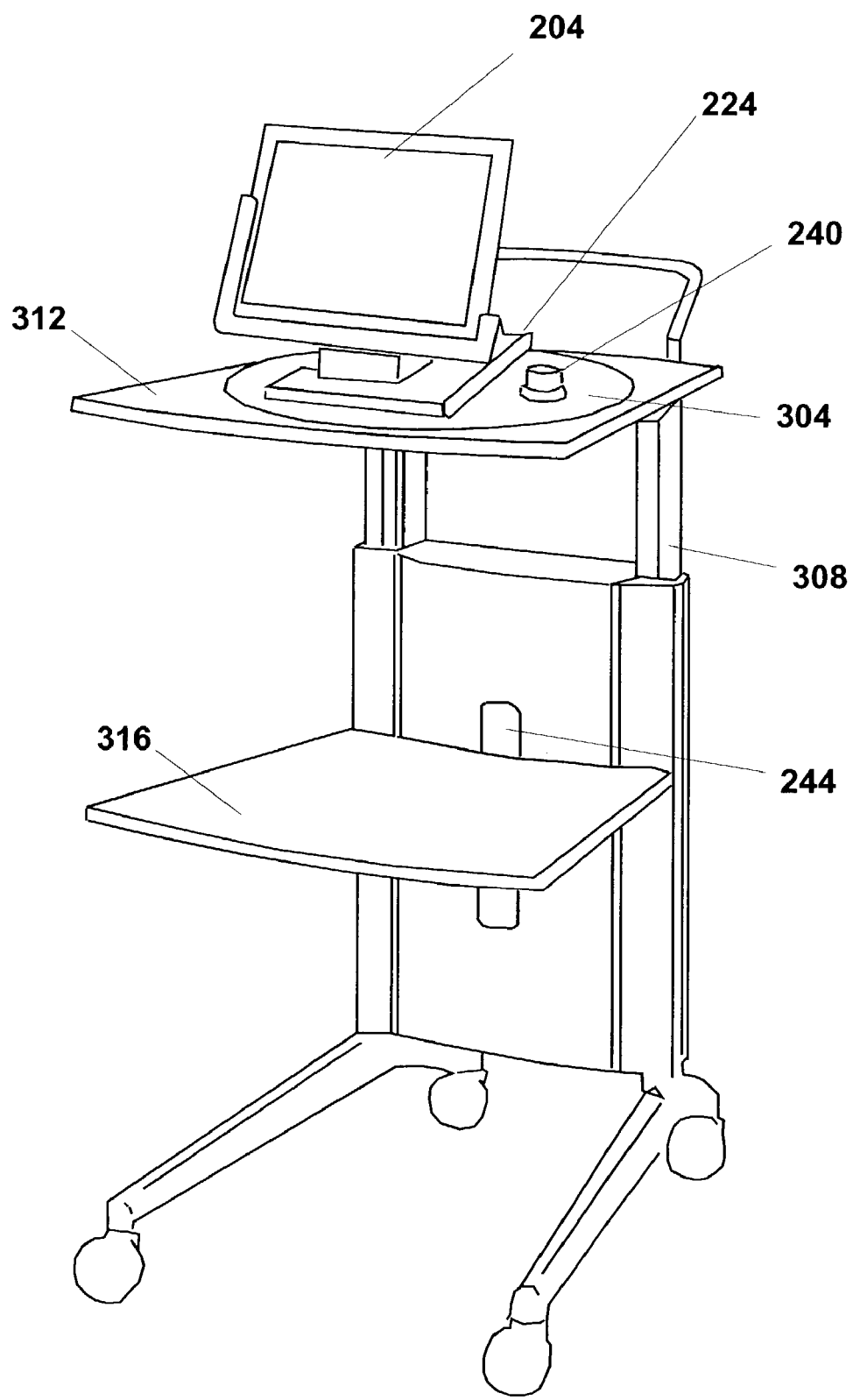
FIG. 3—A view of one embodiment of the present invention featuring a docked tablet computer on a cart.

FIG. 3 shows the tablet computer 204, docking station 224, volume control 240, on turntable 304. The turntable 304 is on cart 308. The height of the top shelf 312 can be adjusted as can the height of the printer shelf 316. The rechargeable battery 244 is not visible in FIG. 3, but is located within the cart 304.

Software

The tablet computer 204 is altered by the operation of software stored in memory within the tablet computer 204. The software includes the instructions and data necessary to direct the computer to display images as discussed below, receive input from the tablet as discussed below, and interact with the speaker controller, printer, and any external networks as discussed below. The software may be comprised of a series of files. In most instances, a programmer will use tools within one or more pieces of application software such that the actual program that alters the computer is a combination of application software written by a third party and additional program files written by the programmer to operate the computer and access the required data.

A preferred embodiment of the present invention has been written while primarily using a combination of the following tools: Flash MX—(Macromedia, www.macromedia.com)—for the core application development; Flash Studio Pro—(multi.dimensional.media, www.multimedia.com) for functional enhancements for Flash; Photoshop 5.5—(Adobe, www.adobe.com) for graphics design; Freehand 10—(Macromedia, www.macromedia.com) for vector graphics development; Visual Studio—(Microsoft, www.microsoft.com)—to add custom Windows functionality; Word—(Microsoft, www.microsoft.com)—discharge template creation and assembly in multiple languages; Poser 5—(Curious Labs, www.curriouslabs.com)—3D model creation; Sound Forge XP Studio—(Sound Forge, www.sonicfoundry.com) for sound recording and processing; Setup Factory—(IndigoRose, www.indigorose.com) for an installer utility.

Those of skill in the art understand that a common use of a tablet computer is to display certain indicators such as buttons or items for selection and to provide input zones behind these displayed objects so that the movement of the stylus (or finger on a touch screen) to make contact or come in close proximity provides an input that has been programmed to correspond to the particular displayed indicator. In order to avoid repeating this concept throughout this application, the displayed item will be treated as an input selection choice without making the displayed image/zone of input distinction.

Selection of Language for Interview

Figure 4:
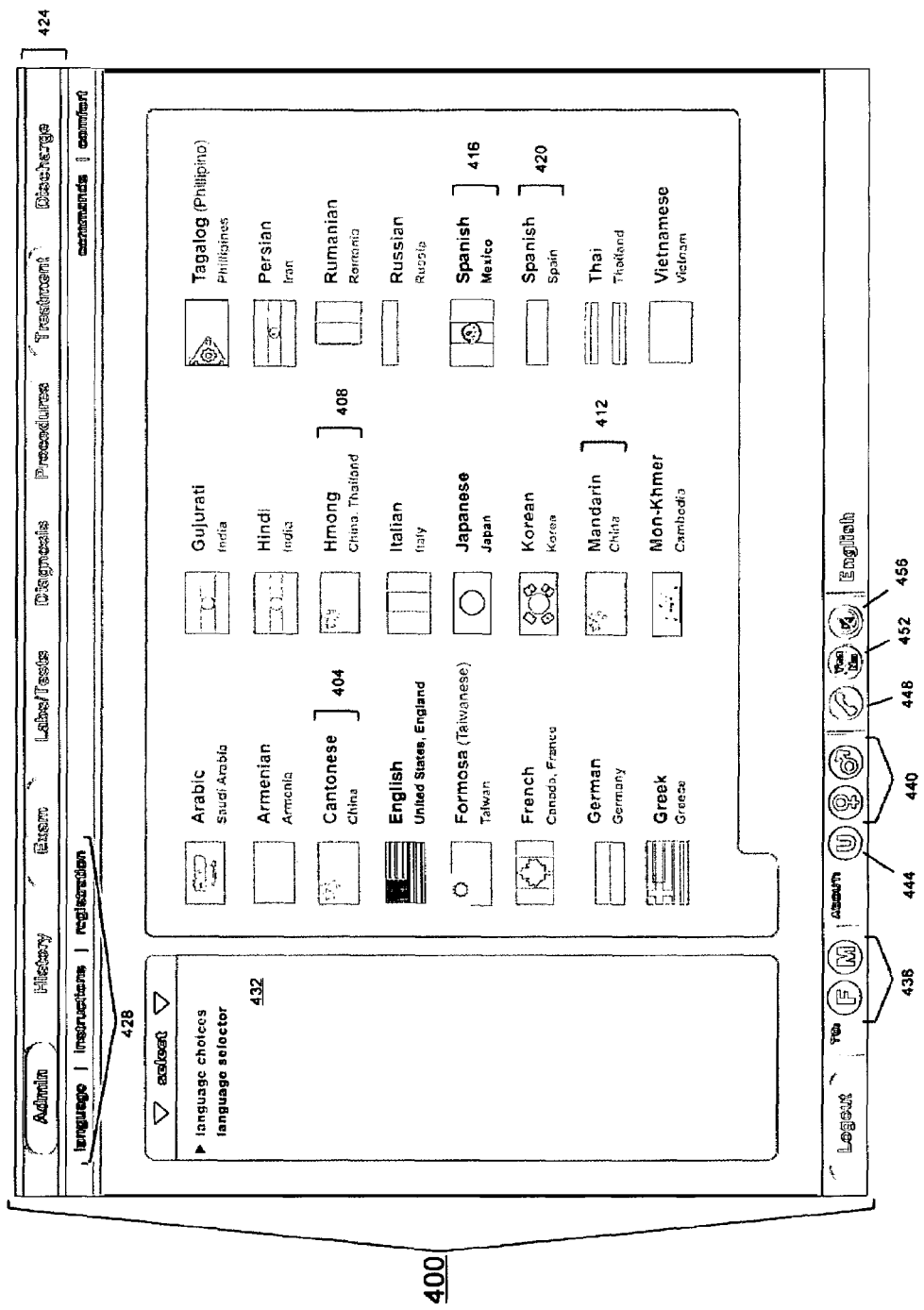
FIG. 4—An example of a computer display screen displayed to allow the interviewer to select the language to be used with the interviewee.

Working with the example of using the invention in a hospital emergency room, when a person arrives at the emergency room who does not speak a language spoken by the service provider, the first step is to identify the language or languages that the person knows. Sometimes the person can say the English name of the language and then the service provider can input that language choice into the tablet computer using a screen 400 such as shown in FIG. 4. Note that the language and country names are written in the language of the service provider/interviewer (in this case United States English). Note that choices 404, 408, and 412 are all languages spoken in China. Note further, that choices 416 and 420 are for two different variations of Spanish (in this case Spanish as spoken in Mexico and Spanish as spoken in Spain). These examples are illustrative and not exhaustive as a system loaded with a full range of languages would have many different language/country pairs as there is not a one-to-one correspondence between languages and countries.

While looking at FIG. 4, one can see that a preferred embodiment organizes the families of screens by notebook tabs 424 along the top of the screen that are arranged in the typical order of events for the set of interactions with an emergency room patient or guardian of a patient. The various notebook tabs can be further subdivided by subsection choices 428. Along the left side of the screen is a set of screen choices 432 within this family of screens corresponding to the notebook tab "ADMIN" and subsection choice "Language".

Along the bottom of the screen are buttons 436 to receive the gender of the interviewee and buttons 440 to receive the gender of the subject of the interview. If the subject of the interview (person needing emergency care) is the interviewee, then the "U" button 444 is selected. Additional buttons on the screen are the interpreter button 448 (described below), a yes/no button 452 (described below) and a speaker stop button 456. The speaker stop button 456 can be used to stop the playing of an audio file. This is useful if the interviewer accidentally activated the wrong screen selection. The language used for the text on the screen is displayed along the bottom of the screen.

Figure 5:
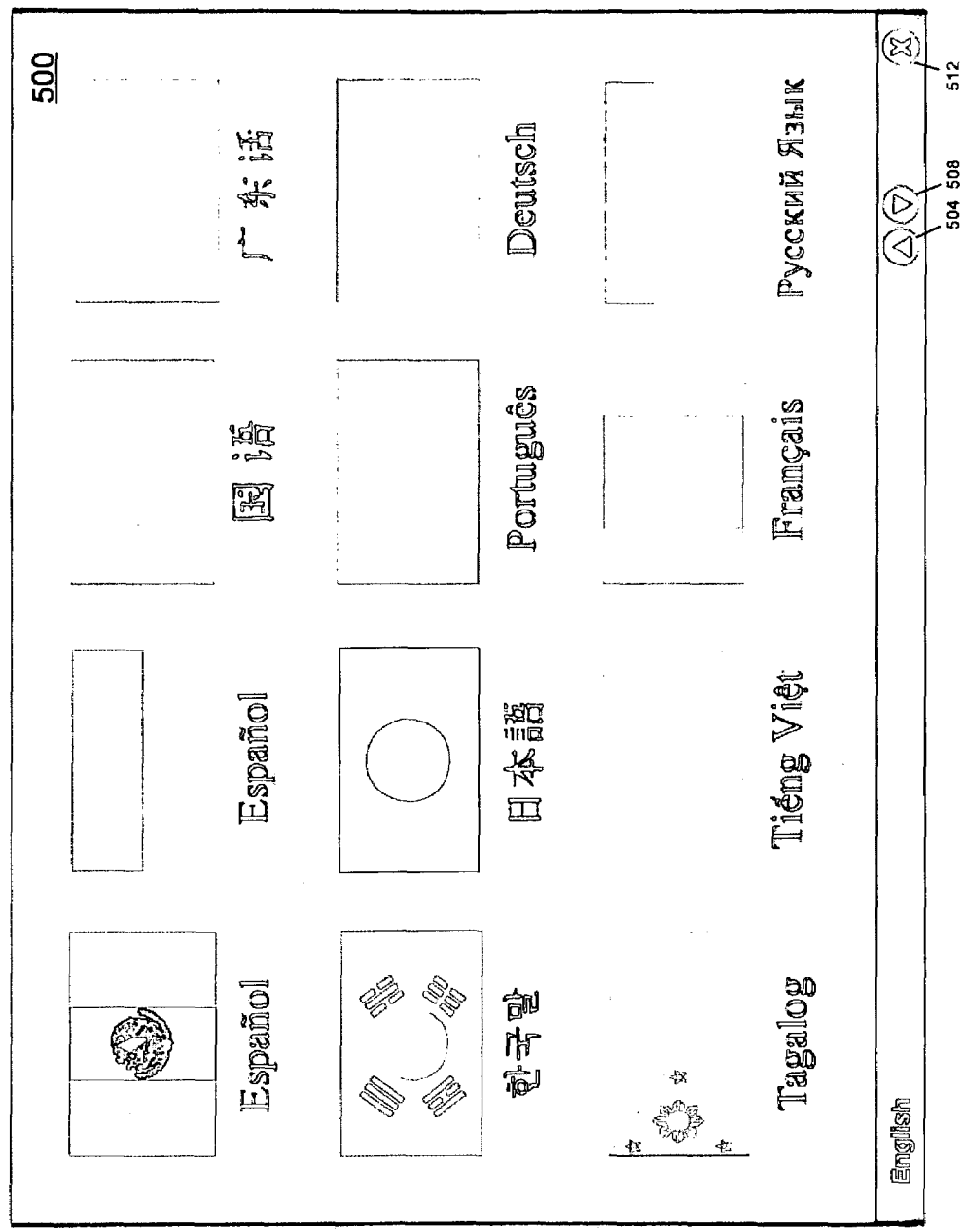
FIG. 5—An example of a computer display screen used to obtain input from the interviewee on the language to be used with the interviewee.

FIG. 5 is used when the interviewer wants the interviewee to provide input on the best language for the interviewee. Determining the appropriate language may not be an easy task. As noted above, approximately 300 languages are spoken by people present in the United States. Recent United States Census data shows more than 50 native languages where each language is spoken by at least several thousand people present in the United States who do not speak English at all or do not speak English well. In other words, certain hospitals or airports in the United States are apt to serve people with limited proficiency in English but speak one of dozens of non-English languages.

Screen 500 displays the flag of a country and the name of a language written in that language as this screen is designed for the benefit of the interviewee. As the area used to display each choice is larger in screen 500 than in screen 400, the same number of choices takes up more than one display screen (not shown). Movement among multiple "pages" of a particular screen is achieved by hitting the up/down buttons 504 and 508. The use of the flag is useful for selecting the version of Spanish spoken in Mexico versus Spanish spoken in Spain. The flag is also useful when the interviewee is illiterate and cannot recognize the text for the language that the interviewee knows. When a given choice is selected on the tablet, an audio file is sent to the speakers 236 with the message "If [name of language] is your language say 'yes'". The entire message including the word "yes" is in the selected language. If the interviewee responds, the interviewer notes the language choice. The screen is closed by the close button 512 and the interviewer returns to the screen from which the interviewer opened the screen to be closed.

If the interviewee is illiterate or blind, the interviewer can select each likely language in succession and the language name will be announced over the speakers. The process can be stopped once the interviewee indicates success. It may be useful to provide the set of language choices by region of the world since the interviewee can often tell that a person is from East Asia but may not be able to distinguish between Japanese and Chinese. It may be useful to provide maps of the world or particular continents so that the interviewee can indicate a region of the world in order to assist the interviewer in narrowing down the choices to a region of the world. The current preferred embodiment would arrange the languages in order of frequency of use for that particular emergency room. Thus, the order of country/language pairs for Miami, Fla. may be significantly different from the order used in New York, N.Y., or Detroit, Mich.

At this stage, the interviewer has obtained the gender of the interviewee and the language to use with the interviewee. If the subject is different from the interviewee, then the gender of the subject has been entered into the system.

Interview

The preferred embodiment of the present invention uses the translation device to facilitate the interaction with the interviewee but does not store the collected medical data. The medical data is recorded by the interviewer using the paper, audio recorder, or electronic system used for collecting similar information from patients that can talk directly with the interviewer.

An important part of this process is the ability to receive a yes or no answer. The yes or no can be indicated by shaking the head, saying yes or no in the language of the interviewer (if the interviewee knows that much of the interviewer's language), saying yes or no in the language of the interviewee (if the interviewer can distinguish yes from no in that language), or by a hand signal such as thumb up for yes and thumb out for no. In a preferred embodiment of the present invention, the head and hand motions are demonstrated with appropriate images or video clips. (not shown).

During the interview which includes a sequence of yes/no questions, the interviewee may need to initially indicate that the interviewee cannot give a yes/no answer (at least not yet). The interviewer should provide the interviewee with a signal to use when this situation arises (such as raising a hand) or the interviewer can discern there is a problem from a delay or facial gesture.

Figure 6:
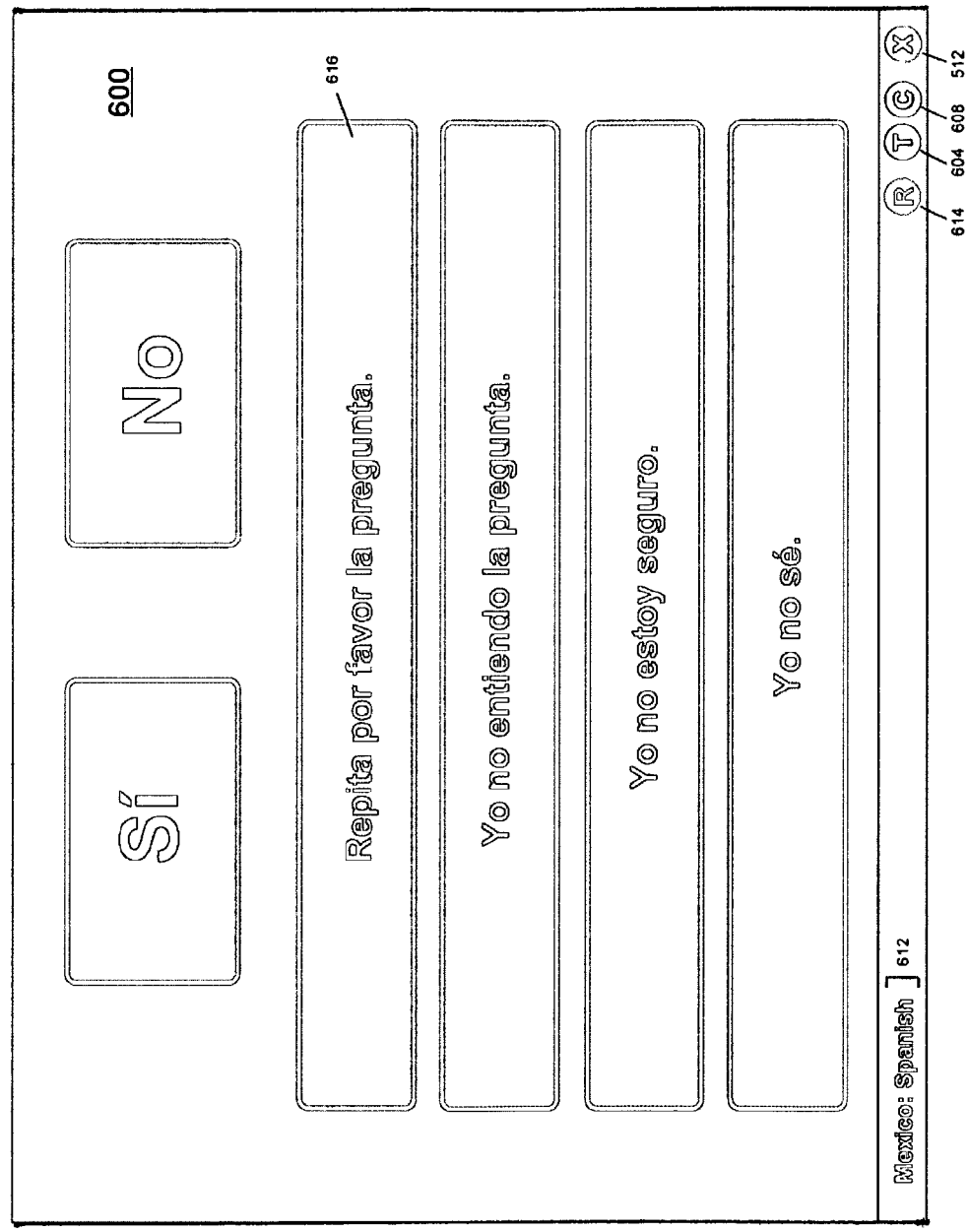
FIG. 6—An example of a computer display screen used to obtain information from an interviewee with respect to a Yes/No question.

When a yes/no answer cannot be given, Screen 600 as shown in FIG. 6 is displayed. The bottom of Screen 600 includes the close button 512, a toggle button 604, and a clear button 608. The clear button 608 can be used to deselect one or all current choices. This is useful when the interviewer demonstrates the use of the stylus and wants to clear out the one or more selections made during the demonstration. The bottom line also indicates in the language of the interviewer the language choice in effect 612, in this case, Mexican Spanish.

The large choices on the screen are written in the language of the interviewee. In a preferred embodiment, the interviewee language starts out as the same language as the interviewer so that the system has something to display or send to the speakers until another interviewee language is selected in order to avoid the erroneous conclusion by a novice user/interviewer that the system is not working.

Figure 7:
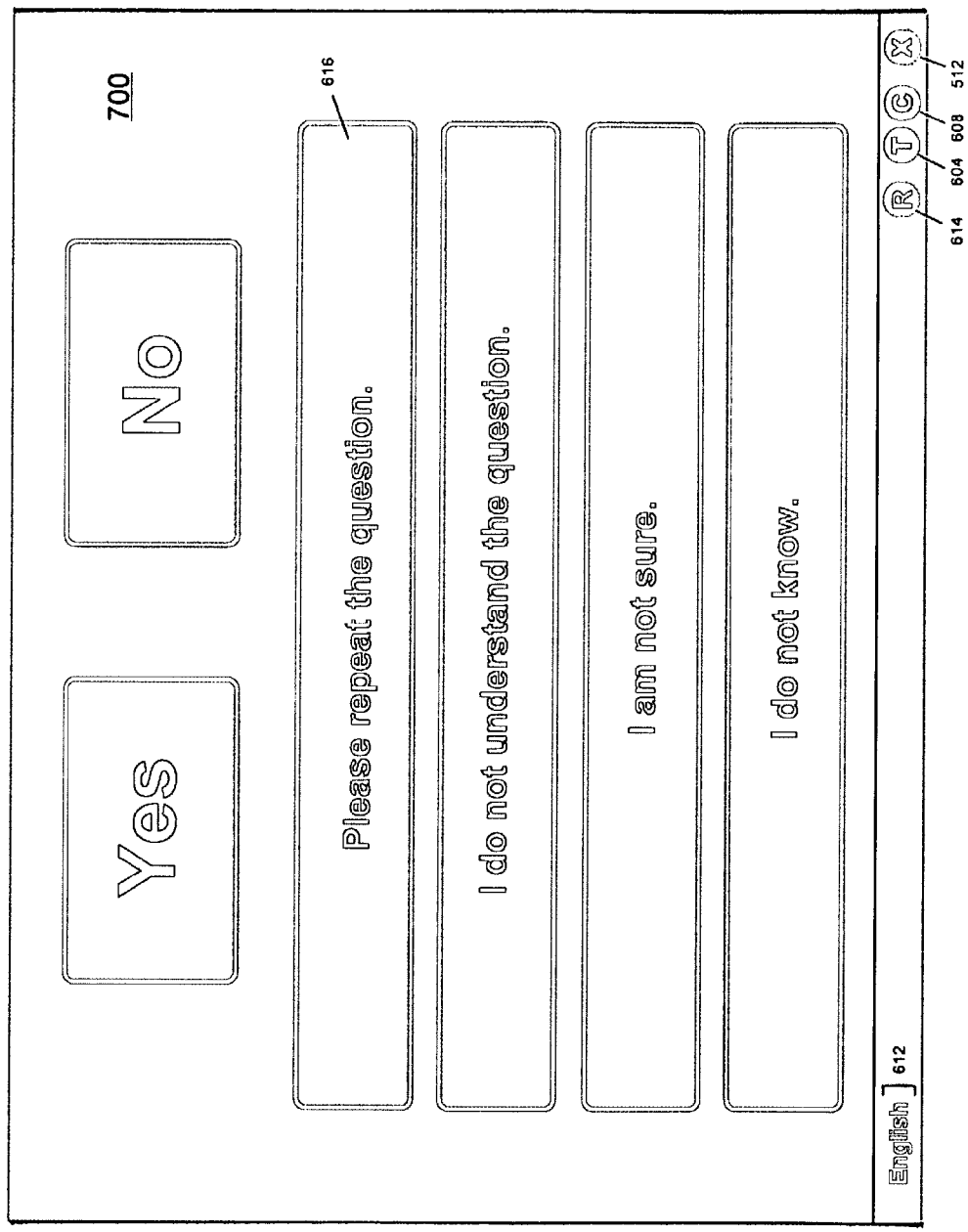
FIG. 7—An example of the toggle feature that changes the displayed screen from the second language to the first language.

As the interviewer will not know all the choices in all the languages, tapping the toggle button 604 will bring up a corresponding screen 700 as shown in FIG. 7. Screen 700 has the same layout but uses the language of the interviewer. As you can see, the choices on screens 600 and 700 are various reasons why an interviewee might not be able to respond. Sometimes repeating the question will resolve the problem and a yes or no can be entered. In one embodiment of the present invention, tapping an R button 614 will cause the last question or instruction to be repeated. Optionally, tapping the repeat the question button 616 can be programmed to cause the automatic replay of the last audio file sent to the speakers without having to navigate back to the question screen to re-actuate playing the audio for the question.

In some instances the question is understood but the interviewee does not know or is not sure of the answer. This may be particularly true when the interviewer is answering about a subject other then the interviewer (such as when the subject last ate or when the symptoms started). For questions that the interviewee does not understand, it may be necessary to show a diagram of the human body (if the interviewee doesn't know the formal medical word for a particular body part. In some cases the interviewee may need an additional explanation in the language of the interviewee. If this information is potentially important, the interviewer may seek the assistance from a human interpreter or may wait until completing as much of the interview as possible then engaging an interpreter to assist in resolving any unresolved questions.

Figure 8:
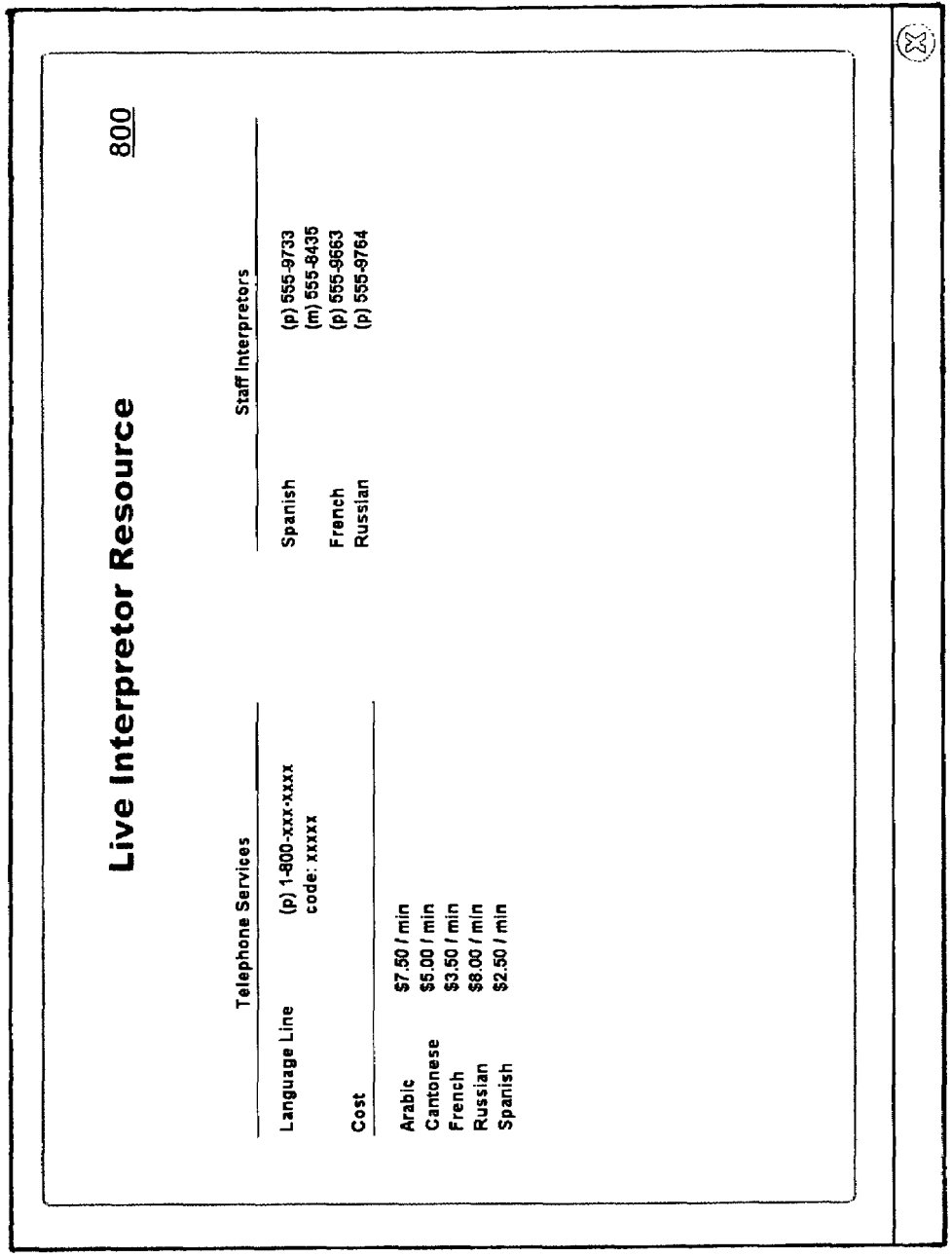
FIG. 8—An example of a computer display screen providing Live Interpreter choices.

To assist in reaching an interpreter, at least some screens used by the interviewer include an interpreter button 448 (shown in FIG. 4). Selecting the interpreter button can initiate a telephone call to an interpreter for the particular country/language pair over the wireless link 220. In the current embodiment of the present invention, the selection of the interpreter button brings up a screen 800 shown in FIG. 8 that provides information on the interpreter resources including a reminder of the great expense per minute of connect time with a third party human interpreter. This screen can also list options for obtaining assistance from interpreters employed by the hospital. If the list of live interpreter resources is long, then it is desirable to limit the information on screen 800 to that which is relevant to the indicated country/language pair. While imperfect an interviewee who speaks Spanish as spoken in Mexico may benefit from an interpreter who speaks Spanish as spoken in Spain. Thus options for interpreters that translate Spanish as spoken in Spain would be provided in addition to the options for Mexican Spanish so that the most timely and cost effective translation service may be selected.

Figure 9:
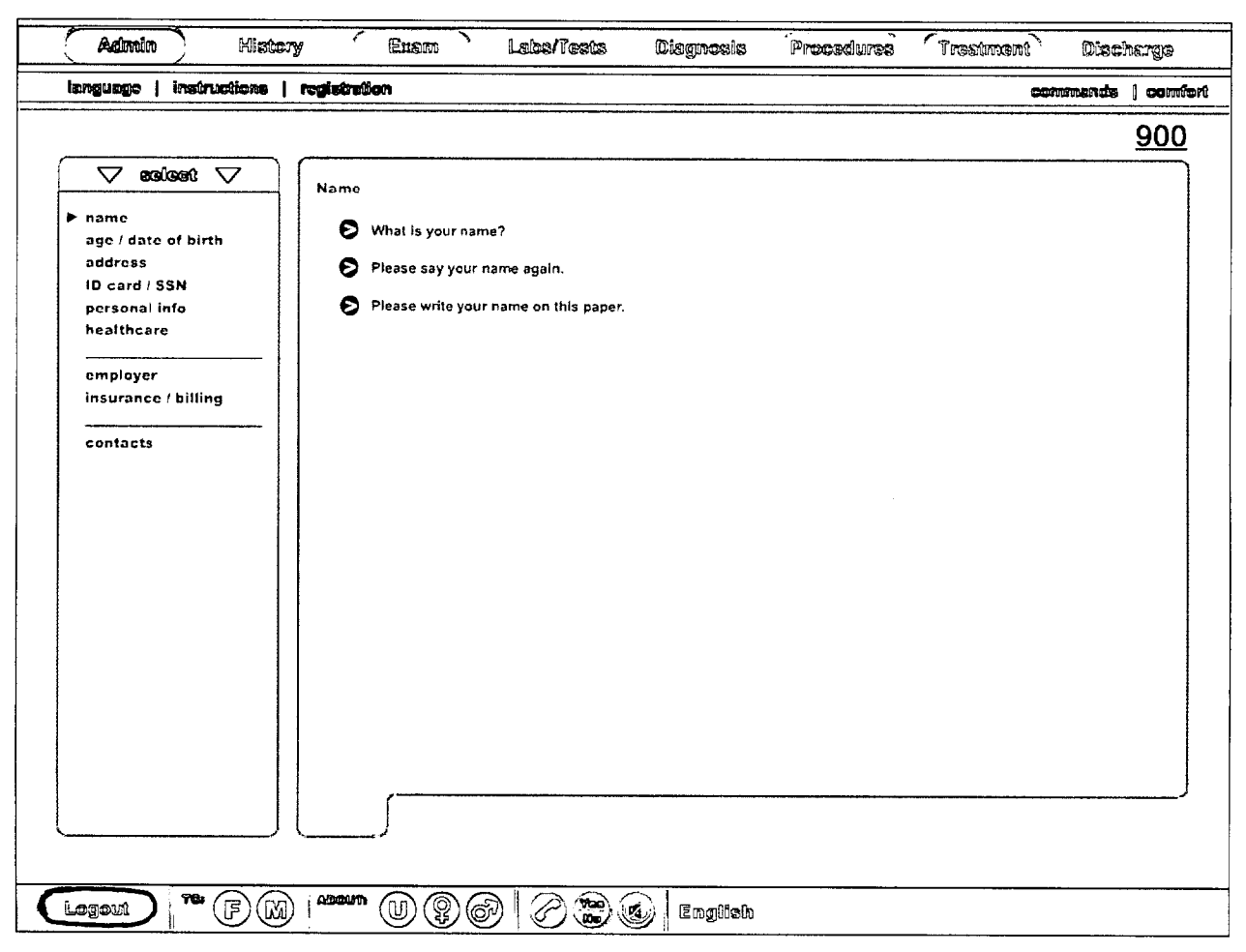
Figure 10:

Screens 900, 1000, and 1100 shown in FIGS. 9, 10, and 11 show three variations of a logical screen to collect the name of the subject. These are all variations of the logical screen that falls under the "Admin" tab, sub-section "Registration" and is the screen for obtaining the name of the subject. Looking at the three screens, one can see how the present invention adjusts the screen displayed to the interviewer to take into account the status of the interviewee and subject. Screen 900 shows the screen variation when the subject is the interviewee.—"What is your name?" To the extent that the language of the interviewee would alter the format of the question based on the gender of the interviewee, the appropriate audio recording is selected and sent to the speakers 236.

Screen 1000 is offered to the interviewer when the device has been told that the subject is not the interviewee and the subject is a female. Note that some questions have been written to cover both genders of the interviewee such as "Are you her mother/father?" The actual question that would be sent to the speakers 236 would say either father or mother as appropriate for the known gender of the interviewee. The use of the mother/father pair form of the question on the display simply reduces the number of screens that must be generated and stored for use in displaying questions to the interviewer. Optionally, a full set of interviewer display screens can be created to remove the need for the this/that pair form of questions.

Likewise the number of screens to display to the interviewer could be further reduced by wording the question displayed on the screen as "Are you his/her mother/father?" The designer felt that having two this/that pairs in a single question was distracting, though one this/that pair was tolerable.

Note that in the preferred embodiment, the actual question sent over the speakers 236 is the appropriate question in context and does not include this/that pairs that could be resolved, given the information provided to the device such as the gender of the interviewee and subject. While not recommended, other less comprehensive variations of the present invention could use this/that pairs in the audio version of the question.

Figure 12:
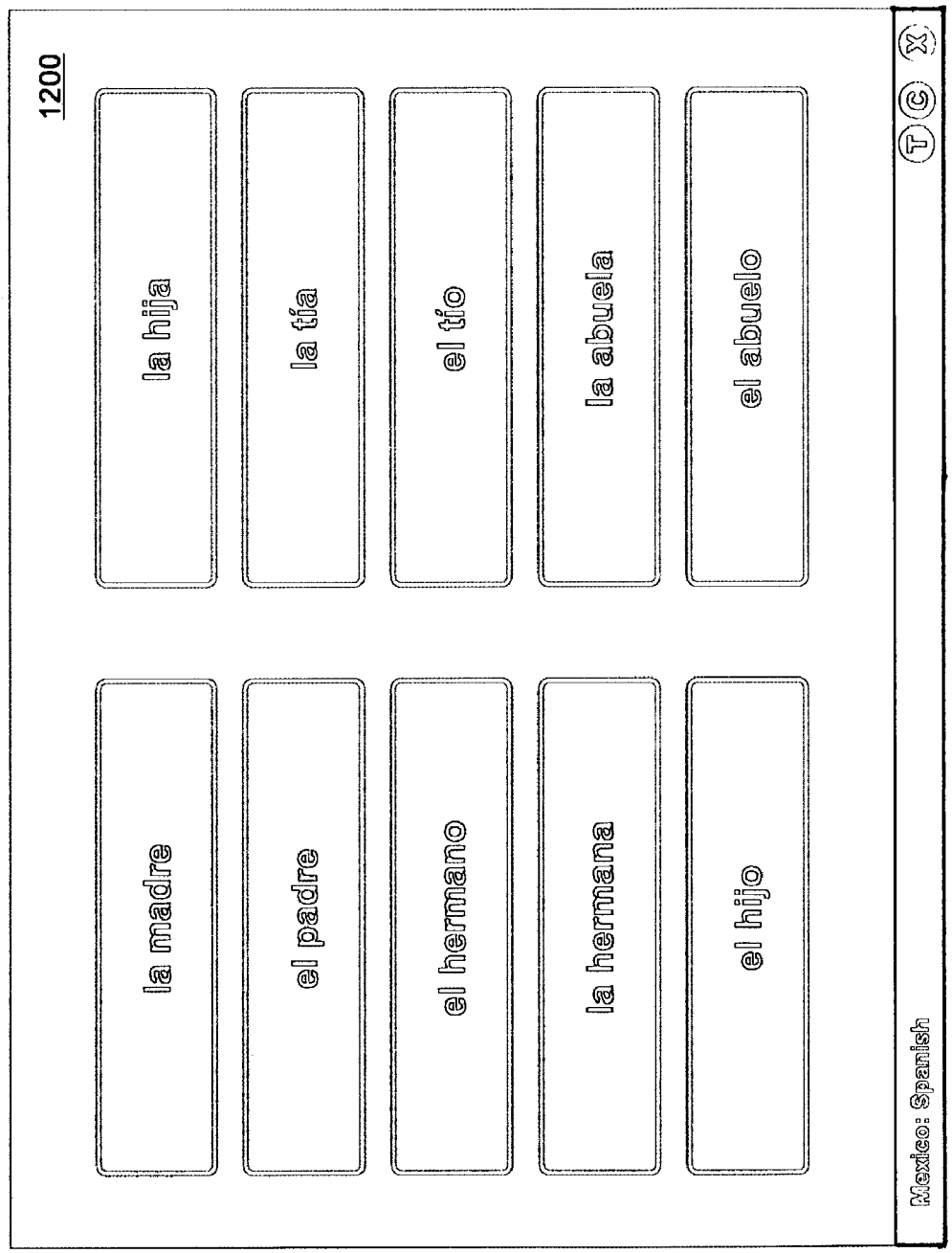
FIGS. 12 and 13 show two versions of a computer display screen for identifying relatives in response to a medical history question.
Figure 13:
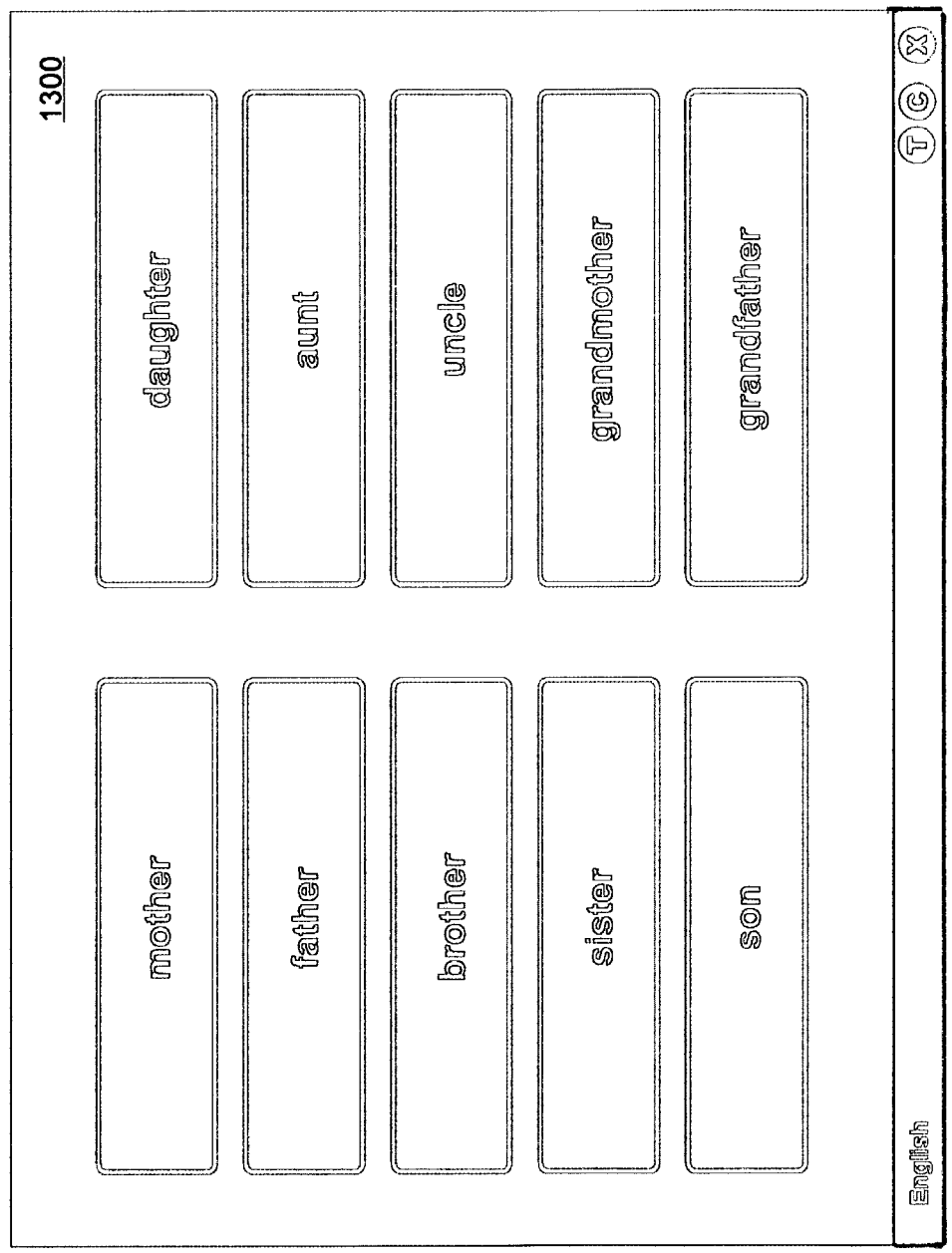

Screens 1200 and 1300 shown in FIGS. 12 and 13 collect another type of information about relatives. For certain medical issues, it is useful to collect information about relatives of the subject who have experienced a certain symptom or disease. These screens illustrate a question where multiple answers may be selected such as when both the subject's sister and the subject's mother had a certain disease. As before, the interviewer can toggle back and forth between the language of the interviewer and the language of the interviewee.

Figure 14:
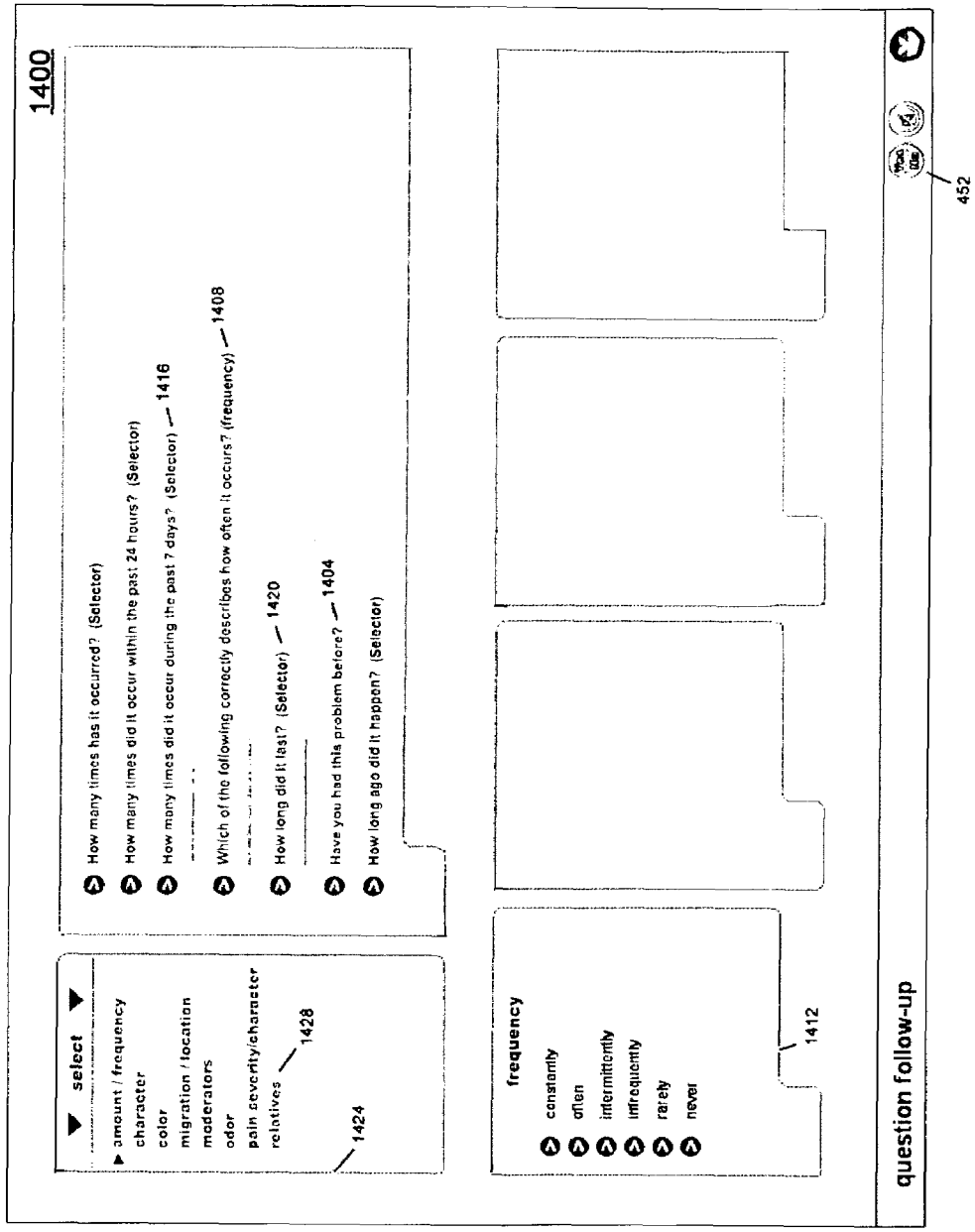
FIG. 14 shows a computer display screen with a subset of follow-up questions and shows the links to more detailed selection choices.

Screen 1400 shown in FIG. 14 is a follow-up screen that contains certain follow-up questions that would be appropriate after the interviewee indicates that the subject has experienced a certain medical problem. The interviewer can then obtain more detailed information. Sometimes the follow-up question will have a yes/no answer such as question 1404 "Have you had this problem before?" Note, since most of the questions for other screens are primarily Yes/No questions, no specific link to the Yes/No screens (FIGS. 600 and 700) is provided after each question requiring a Yes/No answer. To minimize clutter a single Yes/No button 452 is provided at the bottom of the screen.

Sometimes the follow-up question has a natural set of responses such as question 1408 "Which of the following correctly describes how often it occurs?" After announcing this question over the speakers 236, the interviewer can select various frequency indications that are medically reasonable from the set provided on Frequency Choices 1412. After sending each choice to the speakers 236, the interviewer waits for a yes/no response from the interviewee.

Figure 15:
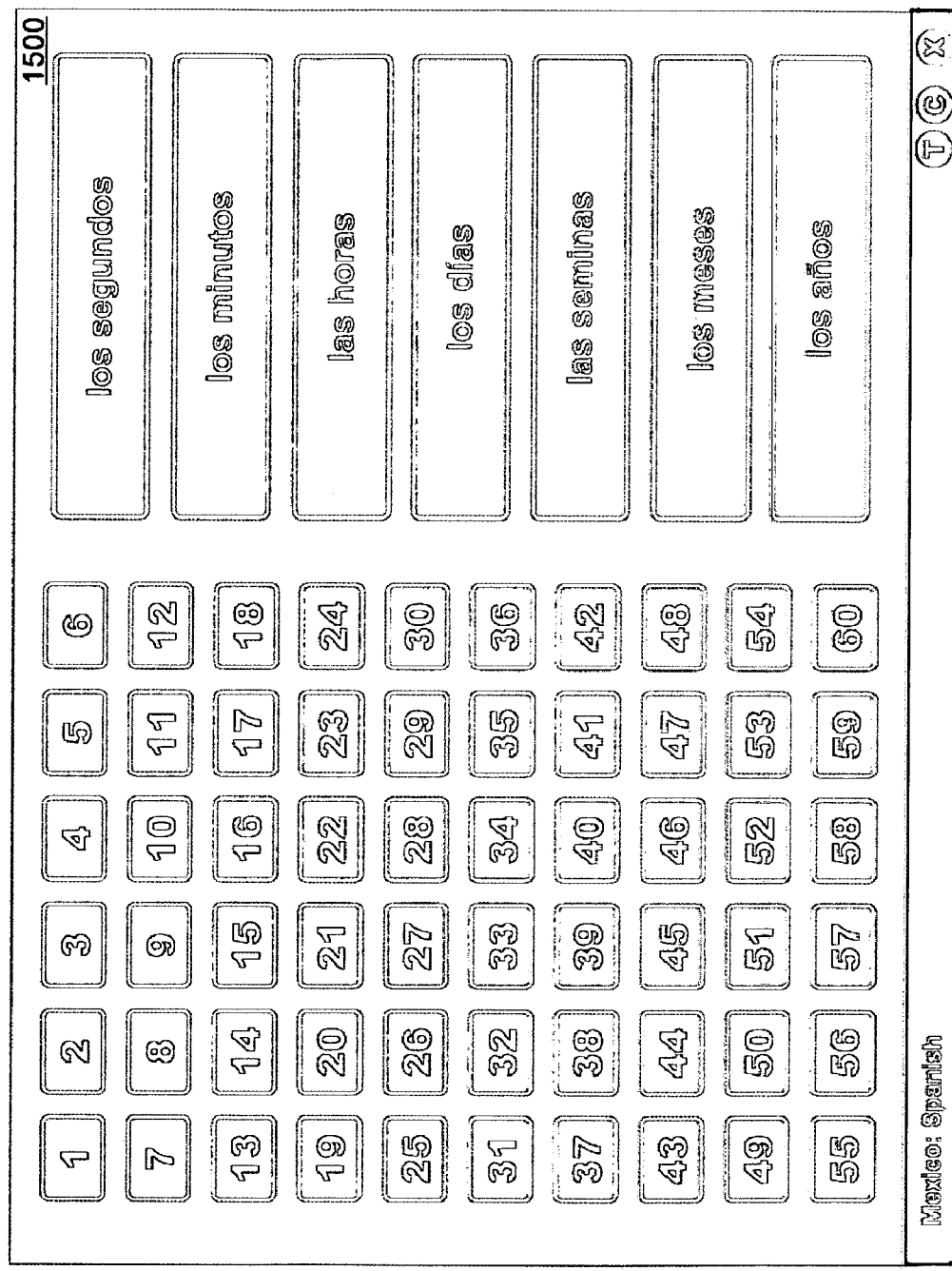
FIGS. 15 and 16 show two versions of a computer display screen for providing a time duration in response to a medical history question.

Some questions need a numeric response such as question 1416 "How many times did it occur during the past 7 days?" or question 1420 "How long did it last?" When seeking a numeric response, the interviewer moves to an appropriate selector screen by tapping the selector notation after the question. Questions seeking a number go to one set of screens. Questions seeking a time period go to the time period input screen 1500 shown in FIG. 15 in the language of the interviewee. On this screen, the interviewee can enter the appropriate number and unit to answer the question.

Figure 16:
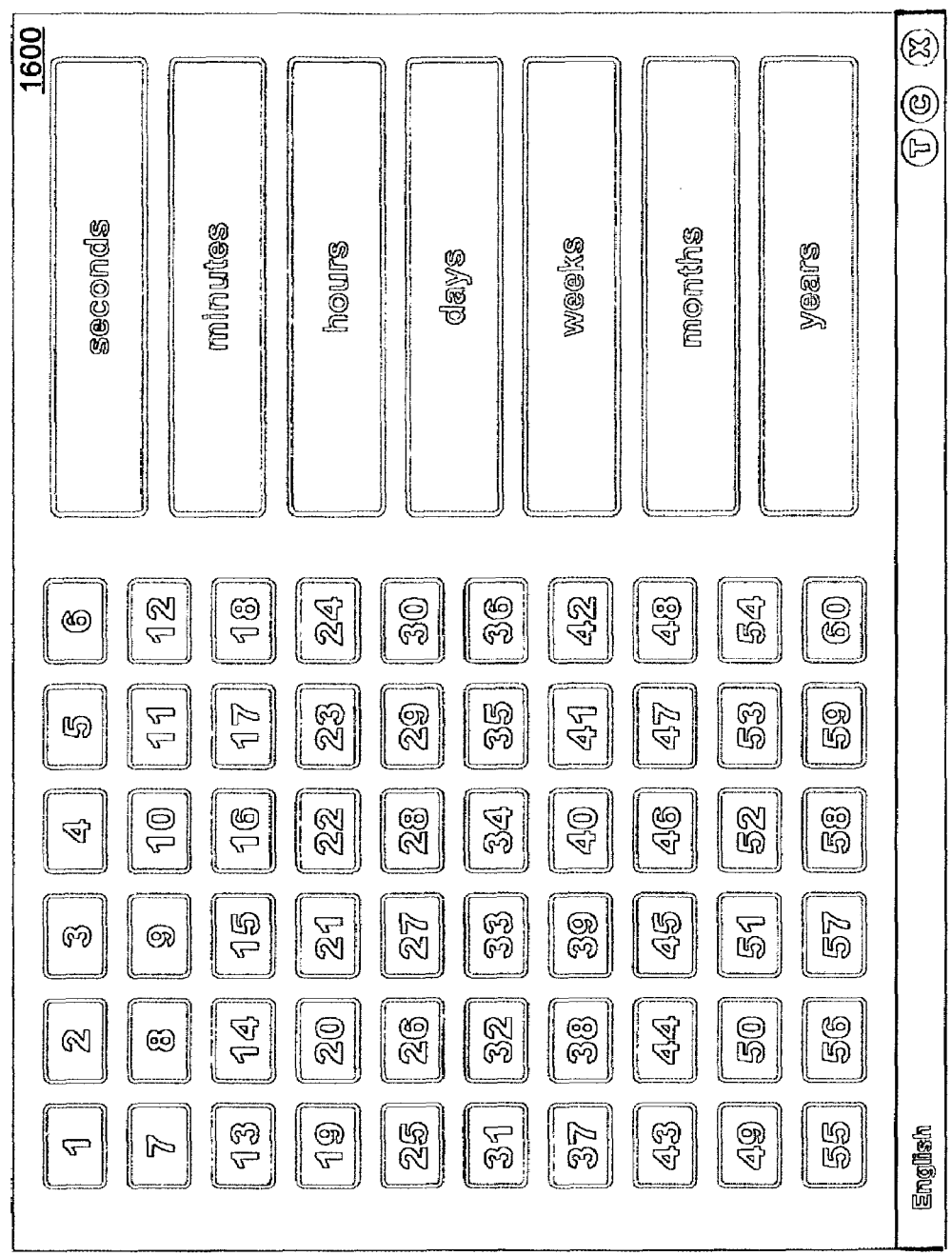

When the interviewer moves the turntable back so that the interviewer can see the display on the tablet computer, the interviewer can toggle to screen 1600 shown in FIG. 16 to receive the interviewee's response in the language of the interviewer so that the information can be recorded in the medical records.

Screen 1400 shows the subset of follow-up questions related to the follow-up category of amount frequency. Movement to other follow-up categories is done by selecting another follow-up category from the set of follow-up categories 1424. Selection of the category relatives 1428 causes the screen to navigate to screens 1200 and 1300 discussed above.

Instructions to Subject During Exam

In addition to the structured interview, it will be necessary to give instructions to a patient regarding removal of clothing, breathing deeply, or coughing as part of the exam. Likewise it will be useful to explain or warn the patient that the interviewer/service provider is seeking permission to act upon the subject such as hitting with a hammer for reflex testing, or obtaining a blood sample through a finger prick.

Discharge Instructions

An important part of many interview processes, is the printing of instructions to be taken by the interviewee. This written set of instructions is helpful to the interviewee and possibly to those who will subsequently provide assistance to the interviewee or subject after the interview. It may be important for the interviewer to keep a copy of the instructions for the interviewer's files as a business record.

While the example will be given in a medical context, the concept is not limited to the formal discharge process of a hospital or medical practice. For example, someone providing instructions on how to get transportation to a location within the city would want to provide written instructions to the interviewee. It would be useful to provide a second copy of the instructions to the interviewee in the language of the interviewer (such as English) so that the interviewee could hand the relevant section of the English copy of the instructions to a taxicab driver, train ticket vendor, or other relevant person.

Figure 17:
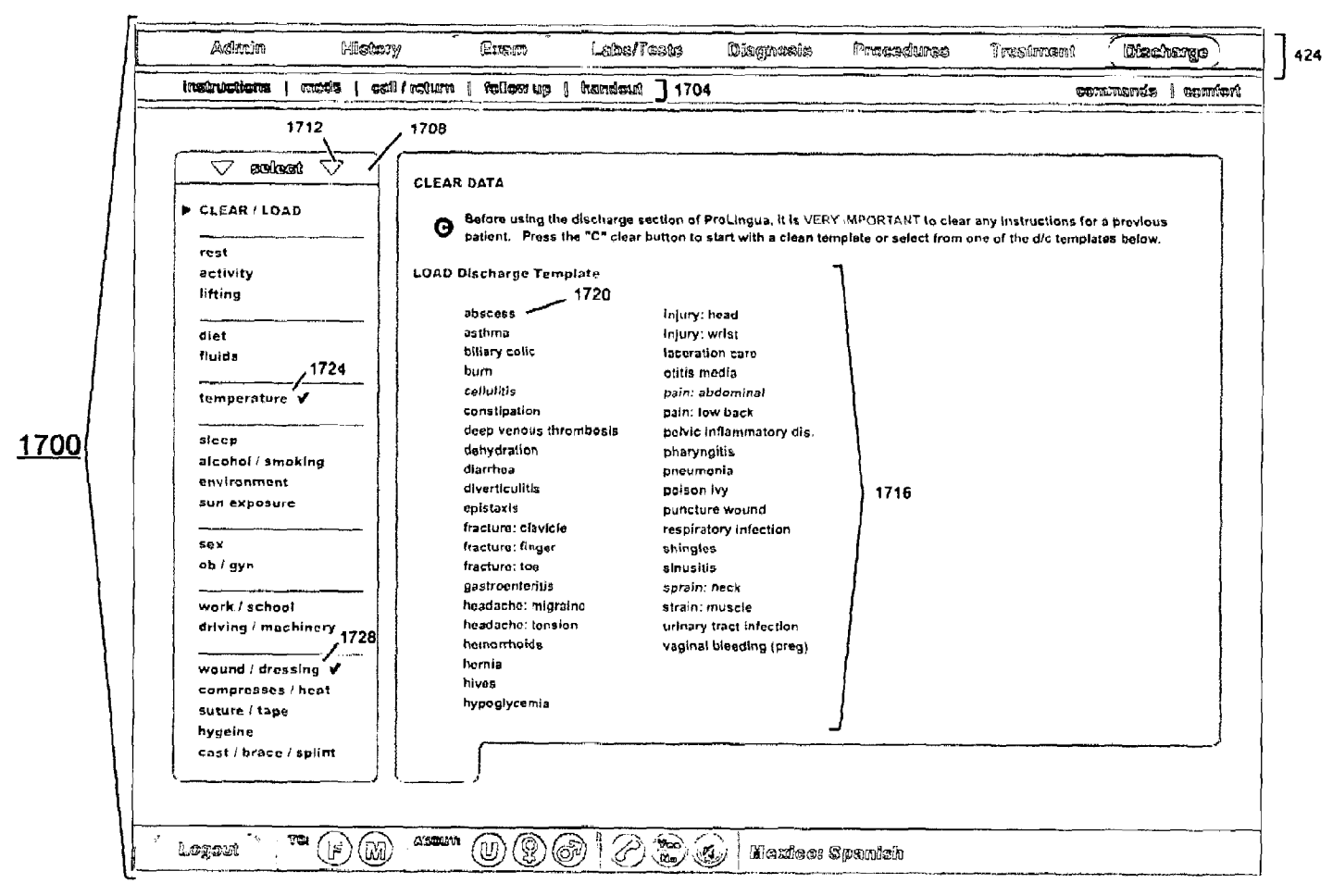

Returning to the medical example, FIG. 17 shows screen 1700 for "Discharge-Instructions" is the first screen presented when the interviewer selects the notebook tab 424 "Discharge" from another screen. After navigating to Screen 1700, the interviewer can step through the relevant sequence of discharge instructions by moving to specific sub-section choices 1704 for: general instructions (as shown in 1700), medication instructions, instructions on when to call or return for service if a situation grows worse, and follow-up instructions.

Within the top-level screen, there is a list of screen choices 1708 (partial list shown on Screen 1700, additional choices available by selecting down button 1712). The interviewer may wish to specify certain instructions and can navigate from category to category of specific instructions by making appropriate choices with the sub-section choices 1704 and the screen choices 1708.

A useful feature of the present invention is the existence of condition templates 1716. This list of templates provides a set of suggested instructions for all the relevant sub-section choices 1704. For example, the selection of "abscess' 1720 highlights the selection links 1724 and 1728 for two screens in the list of screen choices 1708. These screens have specific instructions highlighted in order to provide a guide to the interviewer in what instructions are commonly given for a certain condition. Based on the severity of the condition or other factors, the interviewer may add or omit instructions to the discharge instructions using the tools as more fully described below.

Figure 18:
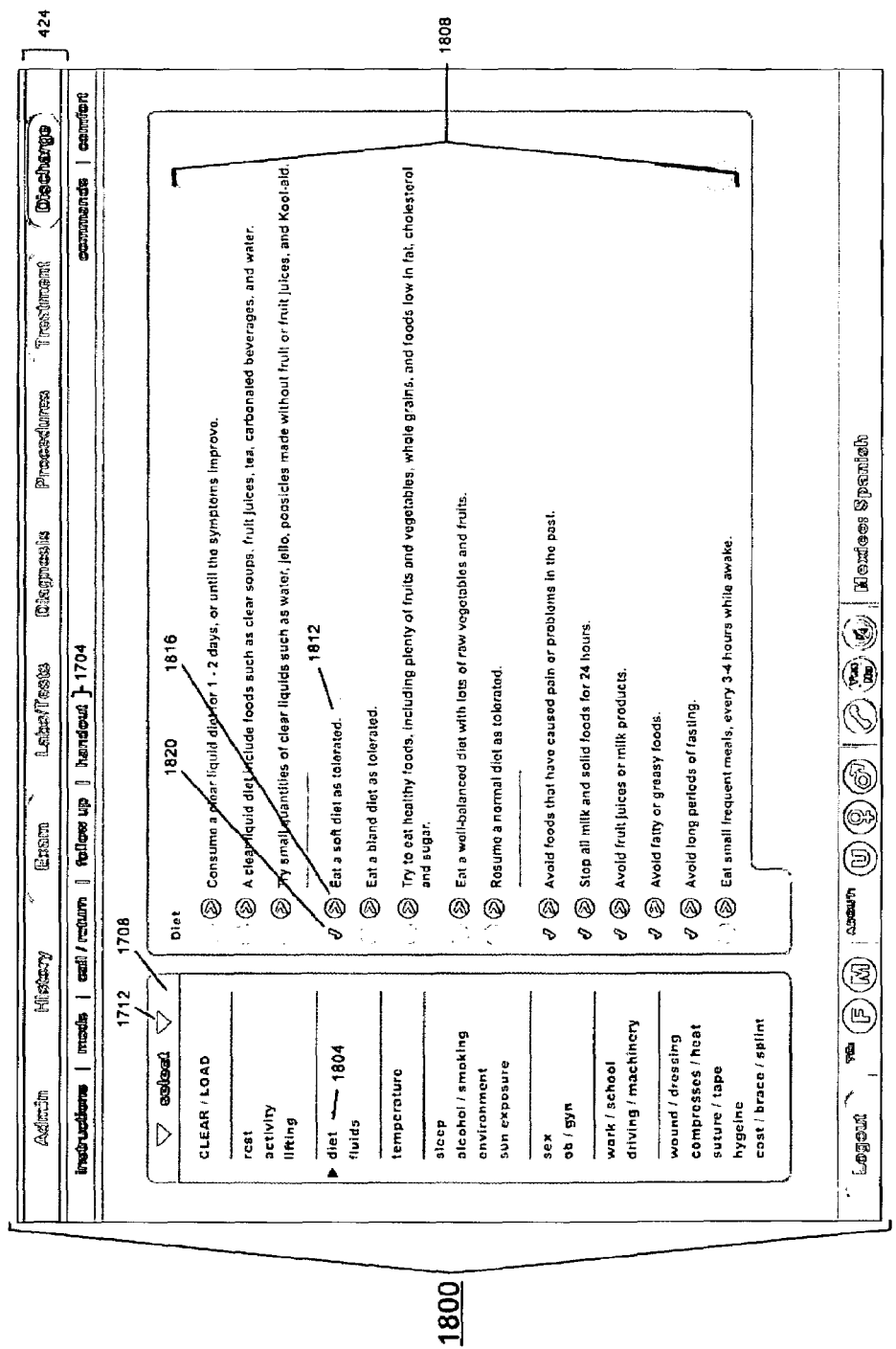
FIG. 18 shows a computer display screen for discharge instructions related to diet and illustrates the option to obtain an audio or a printed version of various instructions.

FIG. 18 shows screen 1800 which corresponds to tab set 424, choice of—"Discharge", sub-section choices 1704 choice of—"Instructions", and list of screen choices 1708 choice of—"Diet" 1804. This screen is illustrative of many screens in the Discharge section. There is a set of instructions 1808 including specific instruction "Eat a soft diet as tolerated" 1812. When the interviewer presses on play button 1816, the audio instruction in the selected language is played on the speakers 236 with appropriate adjustments for context if needed. Pressing on play button 1816 automatically selects the corresponding hardcopy button 1820. Pressing the hardcopy button 1820 a second time will toggle it to not selected. Likewise, a hardcopy button could be selected directly without going through the step of providing an audio instruction if there is a desire by the interviewer to include certain basic information in the printed instructions but no corresponding desire to give an audio instruction. However, in most instances the interviewer will wish to provide an audio instruction followed by the same instruction in writing.

After giving all the discharge instructions or giving a set of instructions for one of the medical conditions, the interviewer navigates to the handout screens. These screens allow the interviewer to route the selected set of instructions to a printer or queue them for printing. The interviewer may want to print two sets of instructions, one in the preferred language of the interviewee and a second set in the language of the interviewer if it is likely that others who speak the language of the interviewer may be involved with the subsequent care of the subject.

Alternative Embodiments

Language used by Interviewer: The examples and background information provided above use English as the language of the interviewer. One of ordinary skill in the art could create the screens for the interviewer in a language other than English or could allow the interviewer to select the language for the interviewer from a list of language choices.

Tablet Computer on a Cart: While it is believed to be advantageous to have a mobile system so that it can be shared by several service providers or used in several examination rooms, aspects of the present invention can be used by a stationary desktop computer. Likewise, the mobile unit could use some other form of computer rather than a tablet computer. A notebook computer or other computer could be placed on a cart with a battery. Likewise, the features of the present invention could be implemented on a computer device carried by the service provider such as a small laptop computer or a Personal Digital Assistant with adequate resources to allow for the storage and processing of a reasonable number of interview questions. The resources of the PDA could be extended by firmware that could be attached to the PDA to provide a certain range of interview questions or a certain language. One would need to dock the PDA or use another link in order to communicate the material needed for a printed set of discharge instructions.

Location of the Software: Those of ordinary skill in the art will recognize that the software to provide the features described above can be located in one or more of the locations. (for example in: mass storage such as a hard drive on the tablet computer, within a specialized ROM or PROM, within media provided to a media drive on the laptop computer, or in firmware cartridges). Some or all of the software could be located outside of the laptop computer. Thus, the laptop computer may load and execute instructions from software permanently stored outside of the laptop computer such as on a network computer accessible to the laptop computer through a wired or wireless link. The laptop computer could be acting as the input and output device for another computer that is actually operating the relevant programs and sending the screen images to the laptop. The "other" computer could be local to the laptop and connected by a local area network or it could be remote from the laptop computer and be accessed by a variety of means such as across the Internet. In the extreme case, the laptop computer can be replaced by a "dumb terminal".

Alternative Inputs: The preferred embodiment uses an input that is a stylus driven tablet that is located in the same space as the display. A touch screen could be used though this would limit the number of choices that could be presented as the fingers cannot be used as accurately as a stylus. A digitizer tablet separate from the display could be used as the input device but this is not as intuitive as directly touching the displayed "buttons". Other input devices could be used including but not limited to light pens, a computer mouse, (or mouse alternative such as touchpad, trackball et cetera), or a keyboard. These other input devices are thought to be less desirable as some people not familiar with English may not have much experience with computer input devices but are likely to have had some experience with pens or pencils. A computer keyboard may be useful for the interviewer but may not be useful to someone unfamiliar with the English characters on the keyboard. Another alternative input is a voice recognition system (microphone and sufficient instructions to convert the input to commands or text). Voice input is most likely to be useful for receiving input from the interviewer. A voice input option may be desirable when the interviewer has both hands busy with an examination of the subject.

Dual Displays

One of ordinary skill in the art could combine the present invention with the teachings of co-pending application Ser. No. 60/420,372 for Inter-Language Dual Screen System. A dual screen system is best for a stationary application such as at a customer counter or at a location where the interviewee is placed across from an interviewer/service provider such as at a hospital check-in or check-out department where various pieces of contact information and financial information are required. However, one could place two screens on a mobile cart and apply many of the teachings of this present invention. Such a system would not need the toggle features as the screen facing the interviewer could stay in a first language and the screen facing the interviewee could stay in a second language. Such a system would benefit from the interview being able to input responses without assistance from the interviewer as the dual screens may impair the view of the interviewer.

Number of Styluses: If the input requires a stylus, then the number of styluses used may vary from application to application. Reason for one: there may be a concern with patient contamination of pen. Under this condition, the patient would point and the user/interviewer would select the choices indicated by the interviewee. Reason for two: in many situations the ability of the interviewee to directly interact with the screen would expedite the process. For stylus pens that have an electronic component and are thus somewhat expensive, the second pen available for the interviewee to use would be tethered just as pens for use by customers are tethered at a bank to avoid inadvertent removal or misplacement of the pen. Those of ordinary skill in the art recognize that there is a need to reduce the risk of cross-contamination from one interviewee to another since many of the interviewees will be sick. Thus, disposable covers and/or periodic cleaning of the stylus will be useful to reduce this risk. Reason for three: the addition of a third stylus will be useful if tethered styluses are used so that one stylus can be tethered to one edge of the cart and the other stylus can be tethered to another edge so that the cart can be positioned on either side of an interviewee.

Graphic User Interface: The present invention includes a useful user interface that arranges information in a way thought useful for an emergency room interviewer. Other arrangements of the same information or other screen navigation methods could be used. For example, not every device falling within the scope of the present invention will arrange the screens using the notebook tab interface. An example of another arrangement style is typified by the Microsoft Internet Explorer browser tool that allows for a hierarchy of "Favorite" links to files or web pages to be arranged in single or multilevel hierarchy of folders.

Collection of Medical Records: The preferred embodiment does not collect medical records within the tablet computer. One of skill in the art could use the present invention in combination with tools for recording medical records. The mobile cart could communicate with other systems in the hospital through the wireless link 220 or through network connector 244. If the unit is mobile, then the medical data may need to be stored until downloaded by cable through network connector 244.

Those of skill in the art will recognize a number of privacy and accuracy concerns that must be addressed should the mobile unit be used to collect information from two or more patients before downloading into a network connection. The privacy concerns arise if confidential information regarding a patient is left within the unit while the unit is left unattended. This is not a concern if the only material information left within a unit is gender, language choice, and a set of selected discharge instructions that do not include information sufficient to identify the patient.

Accuracy concerns occur if there is any chance that an open session for one patient could be contaminated with answers to interview questions from a second patient. These problems are not insurmountable, but they require the combination of known solutions in the field of medical collection records with the inventive aspects of the present invention to form a hybrid device. Hybrid devices using the claimed inventions present in the issued patent would, of course, fall within the scope of the allowed claims.

Incorporation of other Language Modifiers: Note that the preferred embodiment of the present invention uses the "formal" selection in interviewee languages such as used in some languages for pronouns. It is within the scope of the present invention to allow the interviewer to select between formal and informal should the situation be appropriate (such as a police officer attempting to communicate with a young child who may be frightened by the use of the formal form). Likewise, it would be possible to use a plural form for references to the subject (as in the case of two children suffering from the same condition) or interviewee (as in the case when both parents bring a child to the emergency room). The present invention is a reasonable compromise between providing appropriate forms of questions for most circumstances and fully emulating a human translator with additional subtleties. Adding additional factors and variations is not without a cost as each added complexity can add additional forms for each of many questions necessary for the various branches of the structured interviews supported by a given device. In a variation of the present invention that uses a computer program to generate the responses rather than triggering the selection of pre-recorded answers, it may be possible to incorporate additional subtleties such as formal/informal and plural/singular. Note, the present invention does not require the use of pre-recorded audio files. One aspect of the present invention simplifies the creation of the text screens for use by the interviewer by avoiding the complications of making screens for all the possible context variations that may exist in the various languages. In the current embodiment, the variations of the audio files are pre-recorded and stored, but this could be replaced with a variation that creates the audio files for the text as needed.

Alternative Uses: The present invention could be employed in uses other than the emergency room use that provided the example for showcasing the various aspects of the present invention. These examples are not exhaustive and are not intended to limit the scope of the claims that follow this description.

A modified form of the present invention could be used in other departments of a hospital. The interview questions and arrangement of tabs for the interviewer could be adjusted to address specific departmental needs such as pediatrics, obstetrics, intensive care units, or other hospital departments.

The present invention would be useful at police stations, immigration offices, law offices, financial institutions, restaurants or other facilities that interact with a range of people who speak a variety of languages. The present invention may be useful in the context of customs, immigration, agriculture questions for people entering a country or other related applications. For example, within the United States, this device would be useful to employees of the Immigration and Naturalization Service (INS) or the Transportation and Security Administration. While the present invention is not a total substitute for a translator, it is a viable substitute for interactions that are typically limited to a range of questions and answers. The present invention can also be used to characterize the nature of the problem or question before assessing whether it is necessary or urgent to obtain assistance from a human translator.

Another example of a non-emergency room use for the present invention include use in pharmacies to gather information such as insurance information, allergies, other medications being used by the subject, and to provide instructions on drug interactions, and proper way to take the drug.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. A translation tool comprising a computer system in turn comprising:

A processor for processing instructions and data;

A set of at least one memory for the storage of instructions and data to be used by the processor;

A means for making the memory accessible to the processor;

At least one display;

At least one input device for receiving input choices from a first person with a first language preference;

At least one speaker for the playing of audio files corresponding to certain text choices presented on the at least one display in a first language corresponding to the first language preference, the audio flies stored in a form accessible to the computer system so that the audio files can be selectively played on the at least one speaker;

A set of instructions stored in the at least one memory accessible to the processor;

The set of instructions including instructions sufficient to initiate the delivery of certain images to the at least one display and to receive input from the at least one input device to obtain at least one type of context information about a second person and at least one type of context information about a third person; and The set of instructions including instructions sufficient for the computer system to receive a selection for a second language for the audio files so that the selection of a certain text string presented on the at least one display in the language of the first language preference causes the playing of a spoken audio file to be played on the at least one speaker where the spoken audio file is in the second language and the spoken audio file includes a context adjustment based on at least one type of previously obtained context information about the second person and at least one type of context information about the third person.

2. The translation tool of claim 1 wherein the set of instructions includes instructions sufficient to support a toggle feature to allow the display the text choices presented on the at least one display to toggle from the text in the first language to text in the second language in response to a first toggle input and to toggle from the text in the second language to the text in the first language in response to a second toggle input wherein the first toggle input is provided by a single input step and the second toggle input is the same as the first toggle input.

3. The translation tool of claim 1 wherein the set of instructions includes instructions sufficient to support a toggle feature to allow the display the text choices presented on the at least one display to toggle from the text in the first language to text in the second language in response to a first toggle input and to toggle from the text in the second language to the text in the first language in response to a second toggle input wherein a text selection highlighted before provision of the second toggle input remains highlighted after the toggle from text in the second language to text in the first language.

4. The translation tool of claim 1 wherein the the spoken audio file in the second language indicates the gender of the second person and the gender of the third person which may be different than the gender of the second person.

5. The translation tool of claim 1 wherein the spoken audio file to be played on the at least one speaker is in the second language and deviates from the selected text string on the at least one display.

6. The translation tool of claim 1 wherein the computer system has access to at least one printer for printing a written record of a set of interactions between the first person and the second person wherein the printed written record includes text in the second language.

7. The translation tool of claim 6 wherein the computer system has access to the at least one printer through a communication link to a computer network.

8. The translation tool of claim 1 wherein a sequence of inputs to the translation tool initiates an audio communication session with a human translator for a specific country/language combination over a communication link.

9. A method of using a translation system for facilitating an interview between an interviewer using a first language and an interviewee using a second language where the second language is not the first language, the method including:

A) providing the translation system at least one piece of context information about a third person different from the interviewer and different from the interviewee into the translation system;

B) providing the translation system with a particular language choice to be used as the second language;

C) displaying a set of text units on a computer display screen in the first language;

D) providing the translation system with a selection of a particular text unit from the displayed set of text units; and E) sending an audio file to at least one speaker by the translation system where the played audio file corresponds to the particular text unit as translated from the first language to the second language and adjusted for the piece of previously provided context information.

10. The method of using a translation system of claim 9 wherein:

the step of providing the translation system at least one piece of context information about the third person includes providing:

1) the gender of the interviewee;

2) that the interviewee is going to present information about a third person that is some person other than the interviewee and the interviewer; and 3) the gender of the third person; and the audio file sent to the at least one speaker by the translation system is adjusted for the gender of the interviewee and the gender of the third person.

11. The method of using a translation system of claim 9 wherein the step of displaying the set of text units on a computer display screen in the first language provides a visual indication of at least one piece of context information about the third person previously provided to the translation system, wherein the visual indication is not located within the set of displayed text units.

12. The method of using a translation system of claim 9 where the played audio file is created after the selection of the particular text from the displayed set of text units.

13. A method of using a translation system for facilitating an interview between an interviewer using a first language and an interviewee using a second language where the second language is not the first language, the method including:

A) displaying a set of text units on a computer display screen in the first language;
B) providing an input to the translation system to select a particular text unit from the displayed set of text units, the input designating the text unit for audio output;
C) providing an audio file to at least one speaker where the audio file contains a verbal instruction in the second language corresponding to the selected particular text unit including a context adjustment based on at least one type of previously obtained context information about a third person, different from both the interviewer and the interviewee;
D) providing an input to the translation system to designate the selected particular text unit for printing; and
E) printing the selected particular text unit in the second language.

14. The method of claim 13 wherein the step of providing the input to the translation system to select the particular text unit from the displayed set of text units serves to designate the text unit for both audio output and for printing.

15. The method of claim 13 wherein the text unit is designated for printing only once but is printed a second time such that one time the text unit is printed in the first language and one time the text unit is printed in the second language.

16. The method of claim 13 wherein the interviewer may select a template corresponding to a particular situation where the template has pre-designated a set of at least two text units for printing such that
1) the step of displaying the set of text units on a computer display screen in the first language includes an indication of the set of text units pre-designated for printing and individual text units pre-designated for printing may be selectively un-designated for printing; and
2) the step of providing the input to the translation system to select a particular text unit from the displayed set of text units, the input designating the text unit for audio output includes the step of selecting a text unit pre-designated for printing to also be selected for audio output.

* * * * *

UNITED STATES PATENT AND TRADEMARK OFFICE
CERTIFICATE OF CORRECTION

| | | |
|---|---|---|
| PATENT NO. | : 7,359,861 B2 | Page 1 of 1 |
| APPLICATION NO. | : 10/421084 | |
| DATED | : April 15, 2008 | |
| INVENTOR(S) | : Lee | |

It is certified that error appears in the above-identified patent and that said Letters Patent is hereby corrected as shown below:

Column 19, Line 17, "the audio flies stored" should be changed to "the audio files stored."

Column 19, Line 44, "to allow the display the text choices" should be changed to "to allow the display of the text choices."

Column 19, Line 54, "to allow the display the text choices" should be changed to "to allow the display of the text choices."

Column 19, Line 64, "wherein the the spoken" should be changed to "wherein the spoken."

Signed and Sealed this
Twelfth Day of April, 2011

David J. Kappos
*Director of the United States Patent and Trademark Office*